US012756605B2

(12) United States Patent
Shao et al.

(10) Patent No.: US 12,756,605 B2
(45) Date of Patent: Oct. 6, 2026

(54) MODULATION SIGNAL PROCESSING APPARATUS AND METHOD, AND MICROCONTROLLER UNIT AND ELECTRONIC DEVICE

(71) Applicant: ZheJiang Geoforcechip Technology Co.,Ltd., Hangzhou (CN)

(72) Inventors: Xudong Shao, Hangzhou (CN); Shaoping Yu, Hangzhou (CN); Song Yang, Hangzhou (CN); Jianlan Xiong, Hangzhou (CN)

(73) Assignee: ZHEJIANG GEOFORCECHIP TECHNOLOGY CO., LTD., Hangzhou (CN)

( * ) Notice: Subject to any disclaimer, the term of this patent is extended or adjusted under 35 U.S.C. 154(b) by 77 days.

(21) Appl. No.: 18/852,915

(22) PCT Filed: Feb. 9, 2023

(86) PCT No.: PCT/CN2023/075170
§ 371 (c)(1),
(2) Date: Sep. 30, 2024

(87) PCT Pub. No.: WO2023/185263
PCT Pub. Date: Oct. 5, 2023

(65) Prior Publication Data

US 2025/0219880 A1 Jul. 3, 2025

(30) Foreign Application Priority Data

Mar. 30, 2022 (CN) ......................... 202210322921.4
Apr. 1, 2022 (CN) ......................... 202210338142.3

(51) Int. Cl.
*H04L 27/12* (2006.01)
*H04B 14/02* (2006.01)
*H04L 27/06* (2006.01)

(52) U.S. Cl.
CPC ............ *H04L 27/12* (2013.01); *H04B 14/02* (2013.01); *H04L 27/06* (2013.01)

(58) Field of Classification Search
CPC ......... H04L 27/12; H04L 27/06; H04B 14/02; H04B 14/026
See application file for complete search history.

(56) References Cited

U.S. PATENT DOCUMENTS

2016/0336785 A1* 11/2016 Gao ....................... H04B 5/266
2021/0099016 A1* 4/2021 Bhandarkar ............ H02J 50/12

* cited by examiner

*Primary Examiner* — David S Huang
(74) *Attorney, Agent, or Firm* — Scully, Scott, Murphy & Presser, P.C.

(57) ABSTRACT

A modulation signal processing apparatus and method is provided. The apparatus is applied to a microcontroller unit. The apparatus includes a first signal processing module and a second signal processing module. The first signal processing module is connected to an analog-to-digital converter of the microcontroller unit, and used for receiving a completion mark output by the converter, collecting a conversion value output by the converter, and generating corresponding bit data according to a total number of sampling times and a preset half-cycle value. The second signal processing module is connected to a PWM output timer of the microcontroller unit, and used for converting the bit data into a modulation data packet that complies with a Qi protocol, and respectively calculating a reload value of the PWM output timer and a corresponding frequency modulation parameter according to the modulation data packet and a preset modulation configuration parameter.

20 Claims, 18 Drawing Sheets

MODULATION SIGNAL PROCESSING APPARATUS AND METHOD, AND MICROCONTROLLER UNIT AND ELECTRONIC DEVICE

TECHNICAL FIELD

The present application relates to the field of electronic digital technology, and specifically relates to a modulation signal processing device and method, a microcontroller, and an electronic device.

BACKGROUND

The Qi protocol is a "wireless charging" standard launched by the Wireless Power Consortium, and is a universal specification in the field of wireless charging. In a wireless charging communication protocol that complies with Qi protocol specification, data is transmitted from a power receiver to a power transmitter (RX to TX) using ASK (modulation) data, and data is transmitted from the power transmitter to the power receiver (TX to RX) using FSK (modulation) data. RX can be electronic devices such as mobile phones, watches, tablets, etc., and TX can be electronic devices such as portable power supplies, chargers, etc. Data processing of ASK data or FSK data on the above TX devices is realized under the control of an MCU (microcontroller).

In a wireless charger system, PWM waves are typically controlled by MCU, and signal carriers are output through a H-bridge circuit. FSK data is actually achieved by adjusting the frequency of PWM through MCU control.

With the continuous development of wireless charging and the continuous improvement of people's quality of life, more and more wireless charging products with wider coverage have emerged in the market. On the one hand, the emergence of a wide variety of products in the market has led to a sharp increase in the market demand for technology and products in the field of wireless charging; on the other hand, in order to pursue higher charging performance, some products will have to use more expensive elements and components with lower cost effectiveness or adopt data processing methods that occupy more resources. As a result, more cost-sensitive products have emerged in the market, and high-cost application solutions will significantly limit the development of such products.

SUMMARY

The present application proposes a modulation signal processing device and method, a microcontroller, and an electronic device. The modulation signal processing device is integrated into a whole, can directly operate a PWM output timer and an analog-to-digital converter of a microcontroller, and have high compatibility, high accuracy and easy implementation.

In a first aspect, an embodiment of the present application proposes a modulation signal processing device, which is applied to a microcontroller, and which includes a first signal processing module and/or a second signal processing module, in which:

the first signal processing module is connected to an analog-to-digital converter of the microcontroller, and is configured to: receive a completion flag output by the analog-to-digital converter, collect a conversion value output by the analog-to-digital converter, and generate corresponding bit data based on a total number of sampling times and a preset half cycle value; and the second signal processing module is connected to a PWM output timer of the microcontroller, and is configured to: convert the bit data into modulation data packets that comply with the Qi protocol, and calculate a reload value of the PWM output timer and corresponding frequency modulation parameters respectively based on the modulation data packets and preset modulation configuration parameters, so that the PWM output timer outputs a corresponding pulse width modulation signal.

In some embodiments of the present application, the first signal processing module includes a data sampling module and a data decoding module;

the data sampling module receives the completion flag output by the analog-to-digital converter, collects the conversion value output by the analog-to-digital converter, and outputs the recorded total number of sampling times and a first interrupt flag; and the data decoding module receives the first interrupt flag and generates corresponding bit data based on the received total number of sampling times and the preset half cycle value.

In some embodiments of the present application, the data sampling module includes logic circuits and a counter, and the counter is configured to record the total number of sampling times; and the logic circuits are configured to generate a logic value based on the conversion value and preset comparison values, trigger the output of the total number of sampling times when the logic value performs edge jumping, clear the total number of sampling times to zero, and issue the first interrupt flag.

In some embodiments of the present application, the preset comparison values include a reference value and a hysteresis value; the logic circuits include a first logic circuit and a second logic circuit;

the first logic circuit inputs the reference value, the hysteresis value and the logic value, and outputs an actual comparison value based on preset logical conditions; the second logic circuit inputs the actual comparison value and the conversion value, and outputs the logic value; and the preset logical conditions include:

if the logic value is 1, then the actual comparison value is equal to a difference between the reference value and the hysteresis value; and if the logic value is 0, then the actual comparison value is equal to a sum of the reference value and the hysteresis value.

In some embodiments of the present application, the data sampling module further includes a reference value register, a hysteresis value register, a count value output register, a logic value register, and a first interrupt flag register, in which the reference value, the hysteresis value, the total number of sampling times, the logic value, and the first interrupt flag are stored respectively.

In some embodiments of the present application, the data decoding module includes a calculation unit, which determines the number of captured half cycles according to the total number of sampling times, and calculates corresponding bit data according to the number of half cycles based on preset calculation rules;

the preset calculation rules include:

if the number of half cycles is two, then determining the corresponding bit number as 1;

if the number of half cycles is three, then determining the corresponding bit number at the time of first capturing as one 0 and one 1, and determining the corresponding bit number at the time of next capturing as 0;

if the number of half cycles is four, then determining the corresponding bit number as two 0; and if the number of half cycles is larger than four, then determining timeout, data packet sending error, or end.

In some embodiments of the present application, the data decoding module further includes a bit receiving state machine, and the calculation unit sends the calculated bit data to the bit receiving state machine; and the bit receiving state machine performs format verification on the received bit data, stores successfully verified bit data in a data buffer register, and sets a validity flag and a second interrupt flag after completion of verification; and in case of verification error, the bit receiving state machine clears the validity flag, sets the second interrupt flag, and resets.

In some embodiments of the present application, the bit receiving state machine sequentially verifies each bit data written, and sequentially verifies the start bit, 8 bit values, parity check value, and end bit of the data packet.

In some embodiments of the present application, the data decoding module further includes a half cycle value register, a count value reception register, a validity flag register, and a second interrupt flag register, in which the half cycle value, the count value reception, the validity flag and the second interrupt flag are stored respectively.

In some embodiments of the present application, the second signal processing module includes a data packet composition module and a parameter calculation module, in which:

the data packet composition module converts the bit data to be sent into modulation data packets that comply with the Qi protocol, and sends the modulation data packets to the parameter calculation module; and the parameter calculation module calculates the reload value of the PWM output timer and corresponding frequency modulation parameters respectively based on the modulation data packets and preset modulation configuration parameters, so that the PWM output timer outputs the corresponding pulse width modulation signal.

In some embodiments of the present application, the data packet composition module includes a data buffer register, an interrupt register and a control register, in which:

the data buffer register stores the data to be sent written by the microcontroller;

the interrupt register stores interrupt data written by the microcontroller, which is used to mark the completion of a single byte in the modulation data packet; and the control register stores control data written by the microcontroller, which is used to control turning on or off of the data packet composition module, sending of bit data, and the format of the modulation data packet.

In some embodiments of the present application, the control register includes a start enable register and a send enable register; the star enable register stores a start enable status value written by the microcontroller, which is used to control the turning on or off of the data packet composition module; and the send enable register stores a send enable status value written by the microcontroller, which is used to control sending of bit data.

In some embodiments of the present application, the modulation data packet includes a guide preamble and at least one byte of bit data, and the control register further includes a preamble count register; when the send enable status value is on a rising edge and the data to be sent in the data buffer register is empty, the preamble count register stores preamble control data written by the microcontroller, which is used to control a bit number of the guide preamble.

In some embodiments of the present application, the bit data of each byte includes a start bit, a data body bit, a parity check bit, and an end bit; and the control register further includes a parity control register; when the send enable status value is at a high level and the data to be sent in the data buffer register is empty, the parity control register stores an initial parity check value written by the microcontroller, which is used to control an initial value of the parity check bit.

In some embodiments of the present application, the modulation data packet further includes padding data located at the end of the data packet, and the control register further includes a padding control register; when the send enable status value is at a low level, the padding control register stores padding flag data written by the microcontroller, which is used to indicate whether to perform end padding.

In some embodiments of the present application, the parameter calculation module includes a trigger cycle counter and a calculation submodule; the frequency modulation parameters include a load set value of the trigger cycle counter, and the trigger cycle counter counts based on the load set value; if the count overflows, the calculation submodule is triggered to calculate; and after being triggered, the calculation submodule calculates the reload value of the PWM output timer and corresponding load set value respectively based on the modulation data packets and preset modulation configuration parameters, sends the load set value to the trigger cycle counter, and sends the reload value to the PWM output timer.

In some embodiments of the present application, the calculation submodule includes a configuration register and a calculation unit, and the configuration register includes a cycle number register, a cycle difference register, a fundamental frequency register, a modulation level register, and a polarity selection register; and the modulation configuration parameters include a modulation cycle number, a modulation cycle difference, a set fundamental frequency, a modulation level and a modulation polarity stored in the cycle number register, the cycle difference register, the fundamental frequency register, the modulation level register and the polarity selection register respectively.

In some embodiments of the present application, the calculation submodule further includes an intermediate variable register; the calculation unit calculates a logic value corresponding to the bit data to be sent based on the modulation polarity, writes the logic value into the intermediate variable register, and records a high or low logic of output frequency; and the calculation unit calculates the reload value and the load set value corresponding to the logic value under the corresponding modulation polarity based on the preset modulation configuration parameters.

In a second aspect, an embodiment of the present application provides a modulation signal processing method, which includes:

receiving a completion flag output by an analog-to-digital converter, collecting a conversion value output by the analog-to-digital converter, and generating corresponding bit data based on a total number of sampling times and a preset half cycle value; and/or converting the bit data into modulation data packets that comply with the Qi protocol, and calculating a reload value of the PWM output timer and corresponding frequency modulation parameters respectively based on the modulation data packets and preset modulation configuration parameters, so that the PWM output timer outputs a corresponding pulse width modulation signal.

In a third aspect, an embodiment of the present application provides a microcontroller, on which the modulation signal processing device as described in the first aspect is integrated.

In a fourth aspect, an embodiment of the present application provides an electronic device which includes a memory, a processor, a computer program stored on the memory and capable of running on the processor, and a digital logic circuit including the modulation signal processing device as described in the first aspect.

The technical solutions provided in the embodiments of the present application have at least the following technical effects or advantages.

The modulation signal processing device provided in the embodiment of present application is applied to a microcontroller, and includes a first signal processing module and/or a second signal processing module; the first signal processing module is connected to the analog-to-digital converter of the microcontroller, and is configured to: receive a completion flag output by the analog-to-digital converter, collect a conversion value output by the analog-to-digital converter, and generate corresponding bit data based on a total number of sampling times and a preset half cycle value. The second signal processing module is connected to the PWM output timer of the microcontroller, and is configured to: convert the bit data into modulation data packets that complies with the Qi protocol, and calculate a reload value of the PWM output timer and corresponding frequency modulation parameters respectively based on the modulation data packets and preset modulation configuration parameters, so that the PWM output timer outputs a corresponding pulse width modulation signal. In this way, modulation signal processing in accordance with the vast majority of protocols on the market can be adapted to by configuring module parameters. Compared to the software implementation solution, the sending and receiving time sequence of the modulation signal processing device as a hardware peripheral is not affected by software interruption time, making the processing of modulation signals more efficient, accurate, and convenient. Meanwhile, the design of hardware circuit of the device is relatively simple and easy to implement (which can be achieved by directly operating the PWM output timer and the analog-to-digital converter of the microcontroller); in case of software application, only some simple operations are required to complete data transmission, saving MCU computing resources. Moreover, this device can achieve advantages of both software and hardware, and can send data more efficiently, accurately and conveniently while ensuring its flexibility.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present application. Moreover, throughout the drawings, the same reference signs are used to denote the same components. In the drawings.

DETAILED DESCRIPTION

Figure 1:
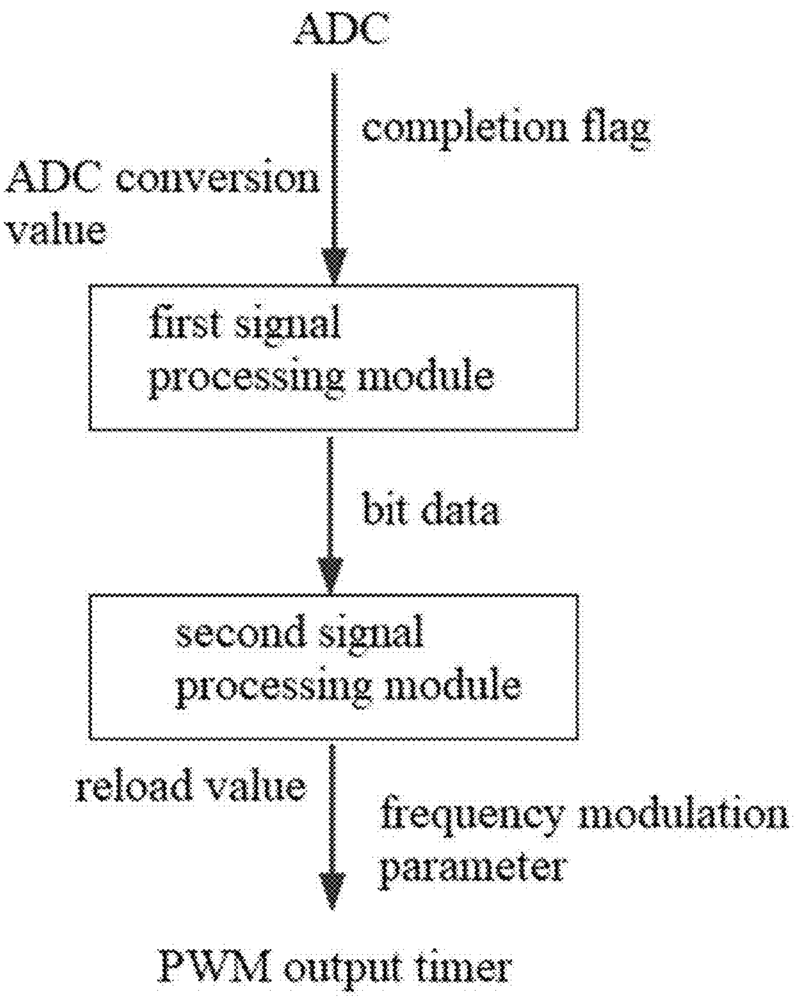
FIG. 1 shows a schematic diagram of a framework structure of the modulation signal processing device provided in the embodiment of the present application.

Hereinafter, exemplary embodiments of the present application will be described in greater detail with reference to the accompanying drawings. Although the exemplary embodiments of the present application are shown in the drawings, it should be understood that the present application may be implemented in various forms and should not be limited by the embodiments set forth herein. On the contrary, these embodiments are provided to enable a more thorough understanding of the present application and to fully convey the scope of the present application to those skilled in the art.

It should be noted that unless otherwise specified, the technical or scientific terms used in the present application shall have the common meaning understood by those skilled in the art to which the present application belongs.

The modulation signal processing device and method, microcontroller and electronic device according to the embodiments of the present application will be described below with reference to the accompanying drawings.

In the relevant prior art, generally, there are following several solutions to achieve ASK data decoding:

1) comparator solution: in which an ASK signal is first converted into an envelope signal through an envelope detection circuit, then the envelope signal is converted into a logic signal through a filtering circuit and a comparator, and duration count is carried out through edge interruption and timer; then, MCU software decodes the data based on the duration count, and data packets completed by decoding are received by software;
2) voltage sampling solution: which is similar to the above comparator solution, except that it uses a filtering and amplification circuit to generate logic signals;
3) current sampling solution: which is similar to the above comparator solution, except that a coil is used for current sampling and a differential amplification circuit is used to generate logic signals;
4) ADC (analog-to-digital converter) sampling solution: in which an ASK signal is first converted into an envelope signal through an envelope detection circuit, then duration count is determined through a timer and ADC; after this, MCU software decodes the data based on the duration count, and data packets completed by decoding are received by software.

The comparator solution has a lower demand for MCU computing resources, requiring MCU to have built-in comparator peripheral, and it is difficult to adjust parameters of the comparator through software configuration; the voltage sampling solution and current sampling solution have a lower demand for MCU computing resources, and require operational amplifiers or specialized highly integrated power management chips. The ADC sampling solution is directly implemented by software, with no need for peripheral circuits to obtain "logic signals" by conversion and no need for other chips, making it easy to adjust parameters through software. However, this high frequency triggered operation requires a large amount of program time for execution, and has an extremely high demand for MCU computing resources. Moreover, the data decoding part in each solution is the same, which can be used as a universal module to reduce the occupation of MCU computing resources. The software receiving part requires the program to be executed according to various different wireless protocols, and cannot be made into a universal module.

In addition, a wide variety of wireless charging products have emerged in the market, some of which use Qi-based private protocols. Due to the different carrier frequencies and slightly different parameter details, the physical layer of FSK is often directly controlled by MCU. Moreover, since FSK requires a very high accuracy of time sequence control, it poses certain difficulties in the software design of MCU. In addition, more cost sensitive products have emerged, and high cost demodulation solutions will greatly limit the development of such products. Specifically, the software implementation solution using MCU has a contradiction between resource occupation and time sequence, mainly reflected in the following aspects: 1) the entire FSK transmission process takes up to 300 ms, and software blocking execution is unreasonable; 2) if other communication such as I2C, UART and SDQ is executed during FSK transmission, the communication time sequence of the lower-priority party will be affected by interruptions; 3) due to the more complex FSK transmission compared to I2C and the like, it requires some registers for judging, calculating, and reading/writing timers, resulting in longer operation cycles, and it is difficult for low-architecture and low-frequency MCUs to ensure the accuracy of FSK time sequence in this case.

In view of the above problems, embodiments of the present application provide a modulation signal processing device and method, a microcontroller, and an electronic device; the modulation signal processing device is applied to a microcontroller, and can be configured to: receive a completion flag output by an analog-to-digital converter of the microcontroller, collect a conversion value output by the analog-to-digital converter, and generate corresponding bit data based on a total number of sampling times and a preset half cycle value; and/or convert the bit data into modulation data packets that comply with the Qi protocol, and calculate a reload value of a PWM output timer and corresponding frequency modulation parameters respectively based on the modulation data packets and preset modulation configuration parameters, so that the PWM output timer outputs a corresponding pulse width modulation signal. In this way, modulation signal processing in accordance with the vast majority of protocols on the market can be adapted to by configuring module parameters. Compared to the software implementation solution, the sending and receiving time sequence of the modulation signal processing device as a hardware peripheral is not affected by software interruption time, making the processing of modulation signals more efficient, accurate, and convenient. Meanwhile, the design of hardware circuit of the device is relatively simple and easy to implement (which can be achieved by directly operating the PWM output timer and the analog-to-digital converter of the microcontroller); in case of software application, only some simple operations are required to complete data transmission, saving MCU computing resources. Moreover, this device can achieve advantages of both software and hardware, and can send data more efficiently, accurately and conveniently while ensuring its flexibility.

The half cycle value can be understood as a sampling value that can characterize the duration of half cycle. The preset half cycle value in this embodiment can be any value, can be specifically set by those skilled in the art according to the actual situation, and is not specifically limited in this embodiment. The modulation configuration parameters may include any parameter that needs to be configured in the signal modulation process, including but not limited to a modulation cycle number, a modulation cycle difference, a set fundamental frequency, a modulation level and a modulation polarity stored in a cycle number register, a cycle difference register, a fundamental frequency register, a modulation level register and a polarity selection register respectively, which can be pre-calculated by MCU and configured into the registers. The preset modulation configuration parameters in this embodiment can be any of the above configuration parameters, can be specifically set by those skilled in the art according to the actual situation, and is not specifically limited in this embodiment.

It can be understood that the modulation signal processing device can achieve any of the functions of "receiving a completion flag output by an analog-to-digital converter of the microcontroller, collecting a conversion value output by the analog-to-digital converter, and generating corresponding bit data based on a total number of sampling times and a preset half cycle value" and "converting the bit data into modulation data packets that comply with the Qi protocol, and calculating a reload value of a PWM output timer and corresponding frequency modulation parameters respectively based on the modulation data packets and preset modulation configuration parameters, so that the PWM output timer outputs a corresponding pulse width modulation signal", or achieve both the above functions, which is not specifically limited in this embodiment.

Reference is made to FIG. 1, which is a schematic diagram showing the structure and application principle of the modulation signal processing device provided in the embodiment of the present application. As shown in FIG. 1, the modulation signal processing device is applied to a microcontroller and may include a first signal processing module and/or a second signal processing module; the first signal processing module is connected to an analog-to-digital converter of the microcontroller, and is configured to: receive a completion flag output by the analog-to-digital converter, collect a conversion value output by the analog-to-digital converter, and generate corresponding bit data based on a total number of sampling times and a preset half cycle value; the second signal processing module is connected to a PWM output timer of the microcontroller, and is configured to: convert the bit data into modulation data packets that comply with the Qi protocol, and calculate a reload value of the PWM output timer and corresponding frequency modulation parameters respectively based on the modulation data packets and preset modulation configuration parameters, so that the PWM output timer outputs a corresponding pulse width modulation signal.

The first signal processing module can serve as an independent hardware peripheral of the analog-to-digital converter, integrated in the MCU, and applied to the ASK data decoding process, thus transforming the ASK data decoding process from software implementation to hardware implementation. The ASK data decoding device can collect the conversion value output by the analog-to-digital converter after receiving the completion flag output by the analog-to-digital converter, and generate corresponding bit data based on the total number of sampling times and the preset half cycle value to achieve ASK data decoding. Compared to the software implementation solution, the sending and receiving time sequence of this hardware peripheral is not affected by software interruption time, and the decoding process will be more efficient, accurate, and convenient. At the same time, the logic of this device is simple, and the design of the required hardware circuit is usually relatively simple, which can be implemented by directly operating the registers of ADC peripheral; in case of software application, only some simple operations are required to complete ASK data decoding, thereby releasing the occupation of a large amount of software computing resources in the MCU.

The second signal processing module can be used for the control process of FSK data transmission, and can serve as an independent hardware peripheral of the PWM output timer. Functionally, it is a data communication interface module integrated into the MCU, thereby releasing the occupation of a large amount of software computing resources in the MCU. It can convert the bit data to be sent into modulation data packets that comply with the Qi protocol, and calculate the reload value of the PWM output timer and corresponding frequency modulation parameters respectively based on the modulation data packets and preset modulation configuration parameters, so that the PWM output timer outputs a corresponding pulse width modulation signal. In this way, FSK transmission control in accordance with the vast majority of protocols on the market can be adapted to by configuring module parameters. Compared to the software implementation solution, the sending and receiving time sequence of the hardware peripheral is not affected by software interruption time, and the control will be more accurate. Meanwhile, the logic of the device is simple, and the design of the required digital logic circuit is usually relatively simple, making it easy to design and implement; in case of software application, only some simple operations are required to complete data transmission, saving MCU computing resources.

The specific structures and functions of the first signal processing module and the second signal processing module will be described in detail below with reference to the accompanying drawings.

Figure 2:
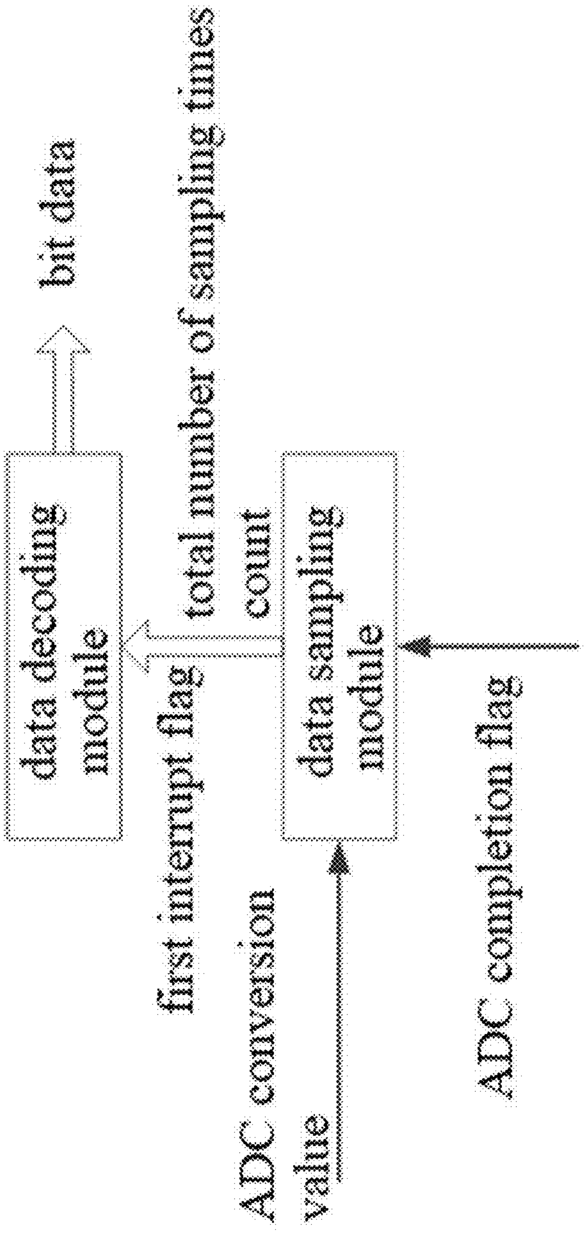
FIG. 2 shows a schematic diagram of a framework structure of the first signal processing module provided in the embodiment of the present application.

Reference is made to FIG. 2, which is a schematic diagram of the structure of the first signal processing module provided in the embodiment of the present application. As shown in FIG. 2, the first signal processing module is applied to a microcontroller and connected to an analog-to-digital converter of the microcontroller, and includes: a data sampling module, in which if the data sampling module receives the completion flag (i.e., ADC interrupt flag) output by the analog-to-digital converter, it collects the conversion value output by the analog-to-digital converter, and outputs the recorded total number of sampling times and a first interrupt flag; and a data decoding module, in which if the data decoding module receives the first interrupt flag, it generates corresponding bit data based on the received total number of sampling times and preset half cycle value.

In this embodiment, the first signal processing module serves as an independent hardware peripheral, and its implementation is similar to the receiving part of the I2C peripheral. That is, the MCU writes into registers through the bus, configures transmission parameters, writes into a data buffer, and responds to interruption requests, etc. The ASK hardware peripheral module directly operates the registers of the ADC peripheral.

The data sampling module is mainly responsible for converting an analog voltage signal on the coil into logic level duration data (i.e., demodulation). The data decoding module is mainly responsible for receiving logic level duration parameters (which can be output by the data sampling module in this embodiment or obtained by software in other ways), and decoding to obtain bytes which are output to the software.

Figure 3:
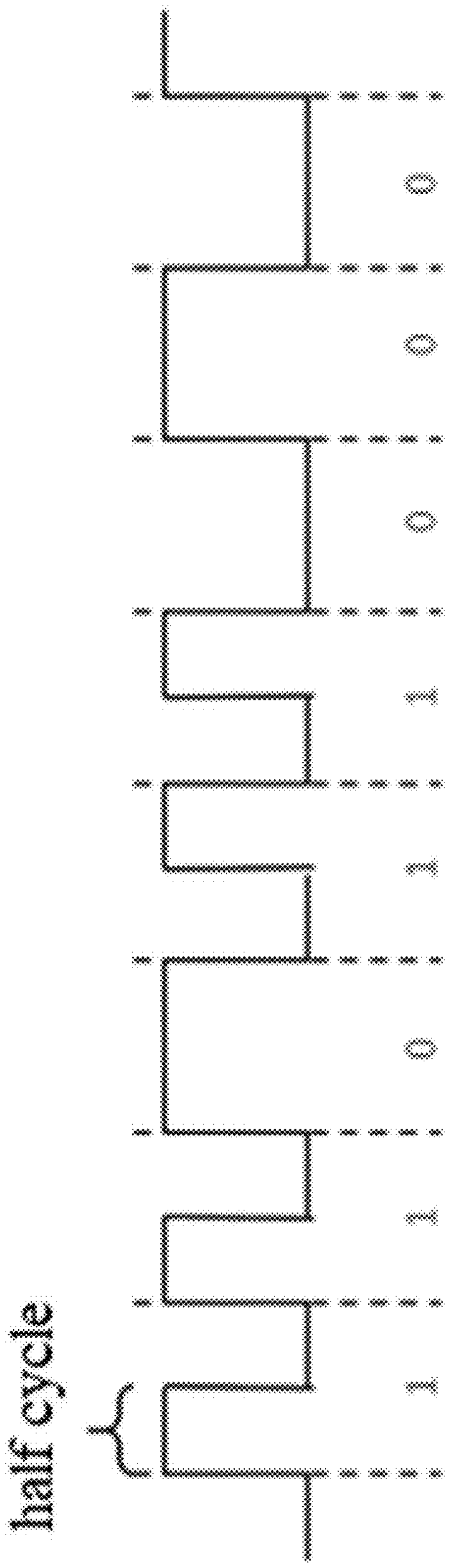
FIG. 3 shows a schematic diagram of the output of bit "0" and bit "1" in the embodiment of the present application.

By referencing and explaining relevant content of the Qi protocol specification, it can be known that the ASK signal represents bit "0" and bit "1" in the way shown in FIG. 3. A simplified square wave is used to represent voltage amplitude changes of the transmission waveform, with bit "0" changing the frequency once in one cycle and bit "1" changing the frequency twice in one cycle. Frequency change refers to the change from high level to low level, or from low level to high level.

Figure 4:
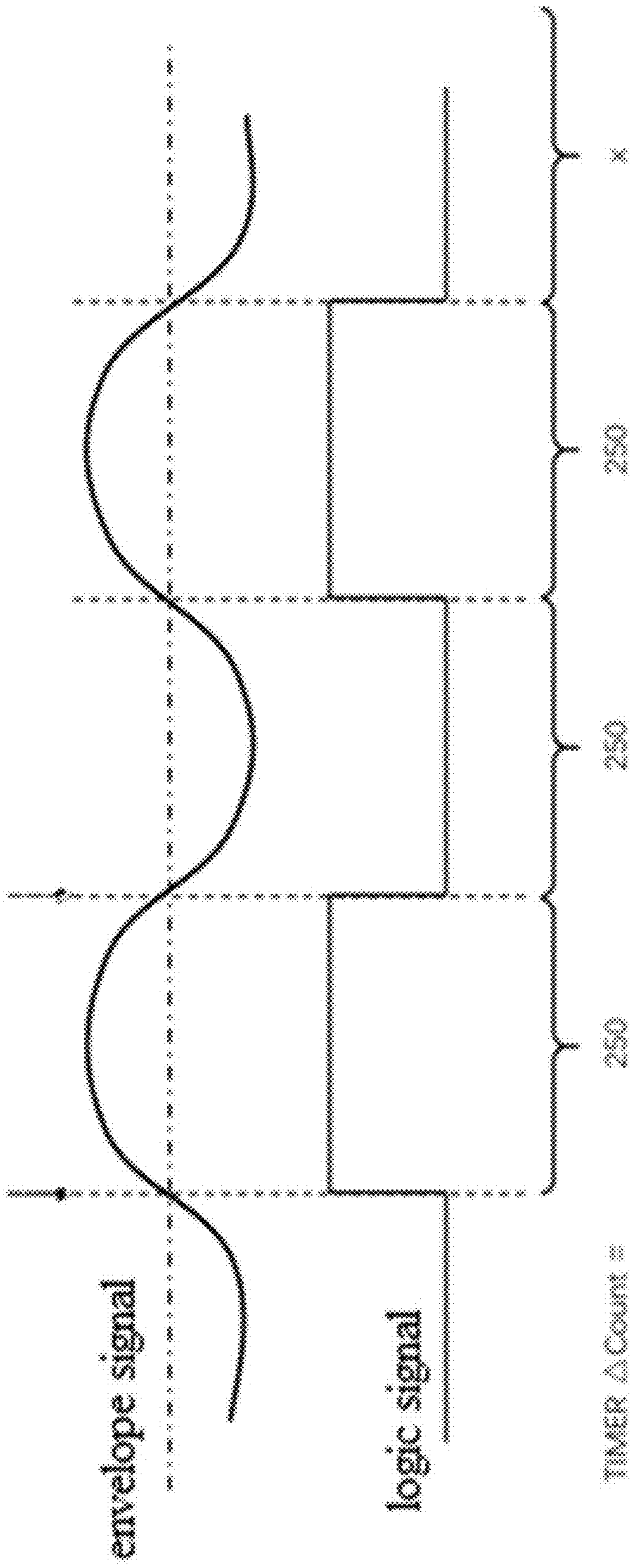
FIG. 4 shows a schematic diagram of the time difference in prior art.

Based on the characteristics of the ASK signal mentioned above, in the prior art solutions other than the ADC demodulation solution, the MCU receives edge interrupt of the logic signal and then obtains the time difference through a counter. For example, when the timer counting frequency is set to 1 MHz, i.e., the cycle is 1 us (a first parameter), if the read "Δ Count" value is 250 (a second parameter), as shown in FIG. 4, then the time difference of 250 us (a third parameter) is calculated based on this. The third parameter is equal to the first parameter multiplied by the second parameter, and the first parameter is selected by the timer with the usage scenario taken into consideration; the third parameter is determined by the actual communication protocol and is affected by fluctuations in wireless reception communication quality.

In this embodiment, considering that the ADC performs signal conversion when triggered by the timer, the envelope signal of the analog variable is converted into a quantized digital variable (which is directly proportional to the analog quantity), and the data sampling module can collect the conversion value output by the analog-to-digital converter each time it receives the completion flag output by the analog-to-digital converter, and record the total number of sampling times; then in combination with the frequency of triggered ADC conversion, the corresponding logic level duration data can be determined. For example, the frequency of the logic signal is 4 KHz (changing 4000 times in one second), and the sampling frequency of the conversion value is set to 8 times the frequency of the logic signal, which is 32 KHz (sampling 32000 times in one second). That is, during the change of each piece of logical signal line, the ADC can sample up to 8 times. Namely, in theory, the ADC can continuously sample a voltage higher than Vref for 8 times, and then continuously sample a voltage lower than Vref for 8 times. The number of sampling times (Count value) is used to record the number of times the same voltage is continuously sampled. Based on the sampling frequency, the time length of this section of voltage change of the envelope signal line can be calculated (equivalent to the third parameter mentioned above).

In some implementations of this embodiment, the data sampling module includes a logic circuit and a counter, and the counter is configured to record the total number of sampling times. The logic circuit is configured to generate a logic value based on the conversion value and preset comparison values, trigger the output of the total number of sampling times when the logic value performs edge jumping, clear the total number of sampling times to zero, and issue the first interrupt flag. In this way, the function implementation of the data sampling module takes the "conversion value" and "completion flag (i.e., timer interrupt)" output by the ADC peripheral as inputs. If the timer interrupts once, the data sampling module will be triggered to run once. After the total number of sampling times is output, the total number of sampling times is cleared to zero for future sampling records. The first interrupt flag is issued to trigger the above data decoding module to perform data decoding.

The output of the total number of sampling times triggered when the logic value performs edge jumping can be the output of the total number of sampling times triggered when the logic value is on a rising edge, or the output of the total number of sampling times triggered when the logic value is on a falling edge, as long as the output is triggered only each time edge jumping is performed in the same direction.

Figure 5:
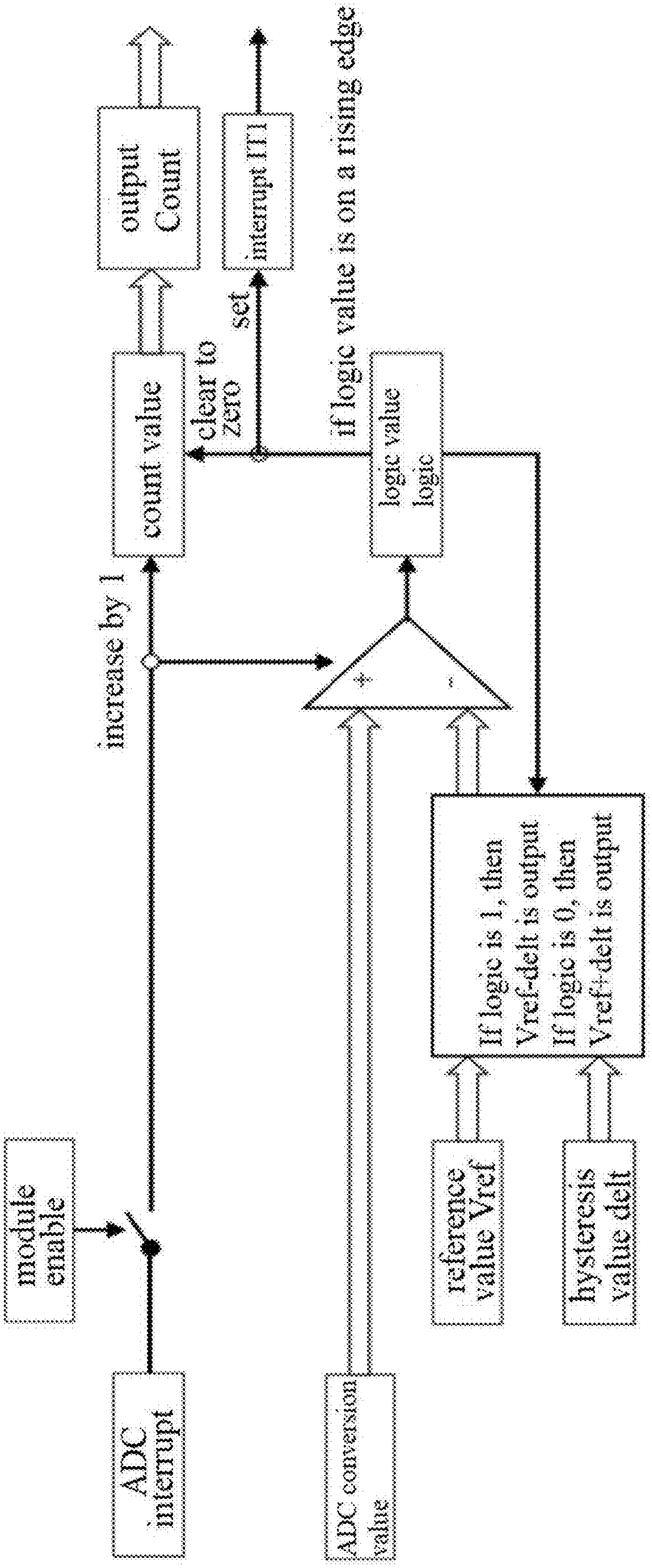
FIG. 5 shows a schematic diagram of an execution logic of the data sampling module provided in the embodiment of the present application.

In some other implementations of this embodiment, the preset comparison values may include a reference value and a hysteresis value. As shown in FIG. 5, the logic circuits include a first logic circuit and a second logic circuit; the first logic circuit inputs the reference value, the hysteresis value and the logic value, and outputs an actual comparison value based on preset logical conditions; the second logic circuit inputs the actual comparison value and the conversion value, and outputs the logic value.

Specifically, the preset logical conditions mentioned above include: if the logic value is 1, then the actual comparison value is equal to a difference between the reference value and the hysteresis value; and if the logic value is 0, then the actual comparison value is equal to a sum of the reference value and the hysteresis value.

The first logic circuit can be any circuit that can achieve the above logical conditions, and this embodiment does not specifically limit its specific circuit structure. The second logic circuit can be a comparator circuit, with the forward input being the conversion value mentioned above, the negative input being the actual comparison value mentioned above, and the output being the logic value mentioned above.

Figure 6:
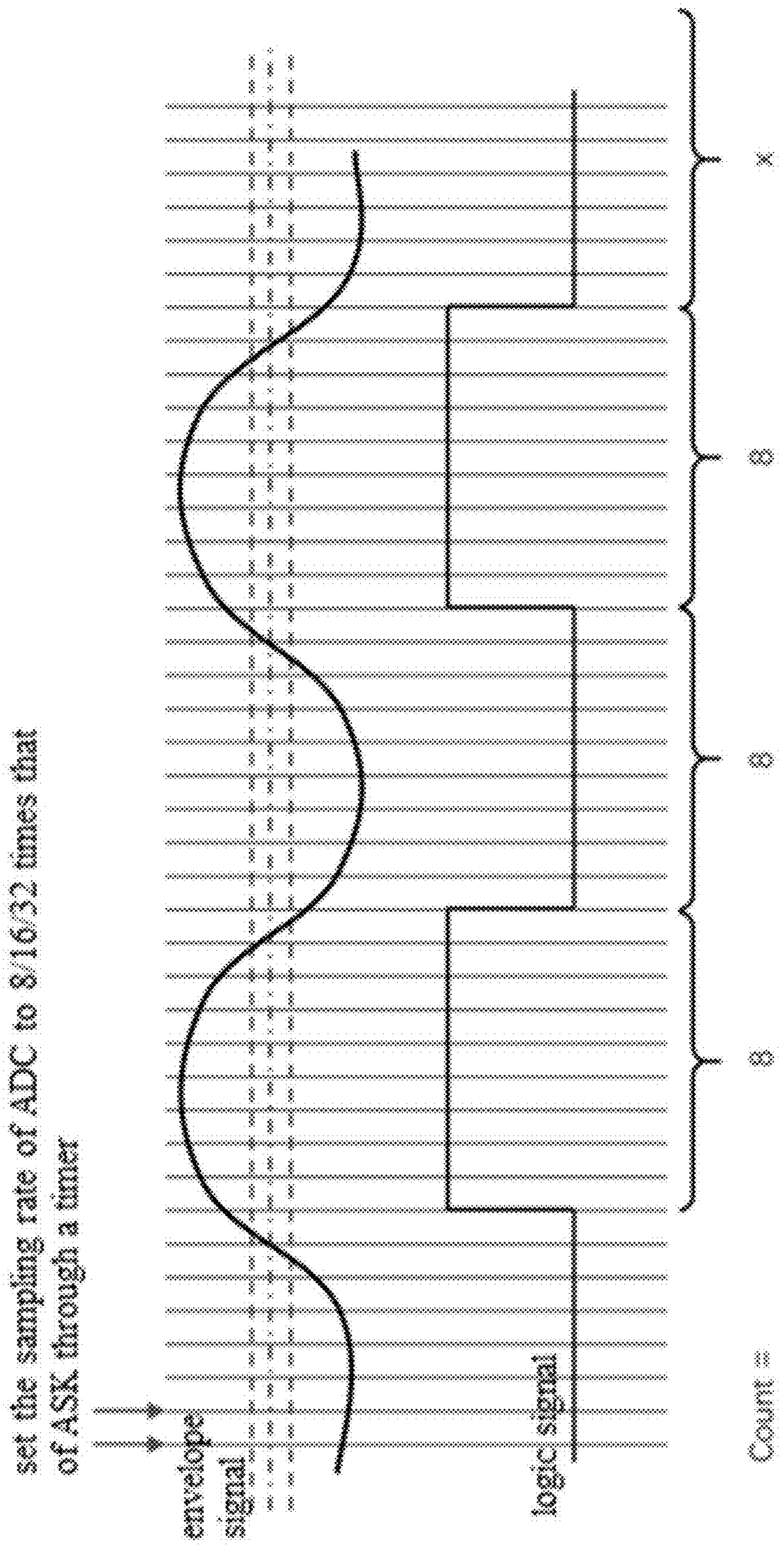
FIG. 6 shows a schematic diagram of the correspondence between the reference value, the hysteresis value and the count value.

As shown in FIG. 6, there are three horizontal lines on the envelope signal line, with the middle one being a reference voltage, i.e., the reference value, and two upper and lower ones being used to define a hysteresis interval, and the hysteresis value is the absolute value of the difference between the reference voltage in the middle and the corresponding voltages of the two upper and lower horizontal lines respectively. That is, the reference value Vref is the center value for comparison, and the hysteresis value delt is the positive and negative difference, both of which are configured by MCU software. By setting the hysteresis value, the comparison value is limited to both ends of an interval, which is equivalent to increasing the range of the comparison value. This can increase system stability, reduce the influence of uncertain logic status and signal fluctuations on the output results, and thus ensure the accuracy of the first signal processing module.

It should be noted that the above reference value and hysteresis value can be set according to actual needs, and their specific values are not specifically limited in this embodiment.

Correspondingly, the data sampling module further includes a reference value register, a hysteresis value register, a count value output register, a logic value register, a first interrupt flag register and a module enable register, etc., in which the reference value, the hysteresis value, the total number of sampling times, the logic value, the first interrupt flag and an enable status value (which is usually a logic value of 0 or 1) are stored respectively.

Based on the above structure of the data sampling module and in combination with FIG. 6, the working process of the data sampling module will be described in detail as follows.

The data sampling module takes the "conversion value" and "completion flag" output by the ADC peripheral as inputs. Each time it receives the completion flag, it changes the value of the module enable register to the enable status value, triggering the module to run once. Each time the sampling is performed, the counter's "count value" automatically increases by 1. The above reference value and hysteresis value can be used to generate an actual comparison value after passing through the first logic circuit, and the actual comparison value can be compared with the conversion value. Based on the comparison results and comparison circuit, a logic value logic can be generated and written into the logic value register to reflect the jump of the "logic signal". The logic value logic can affect the positive and negative nature of the hysteresis value delt, which reacts on the actual comparison value. Then, at each rising (or falling) edge of the logic value logic, the counter's "count value" is output to the count value output register. Then, the count value is cleared to zero, and an interrupt is set (by setting, it means writing the value of the first interrupt flag register to 1). Subsequently, after reading the total number of sampling times in the count value output register, the data decoding module clears the count value output register, that is, writing the value of the count value output register to 0.

In some other implementations of this embodiment, the data decoding module includes a calculation unit, which determines the number of captured half cycles according to the total number of sampling times, and calculates corresponding bit data according to the number of half cycles based on preset calculation rules.

Figure 7:
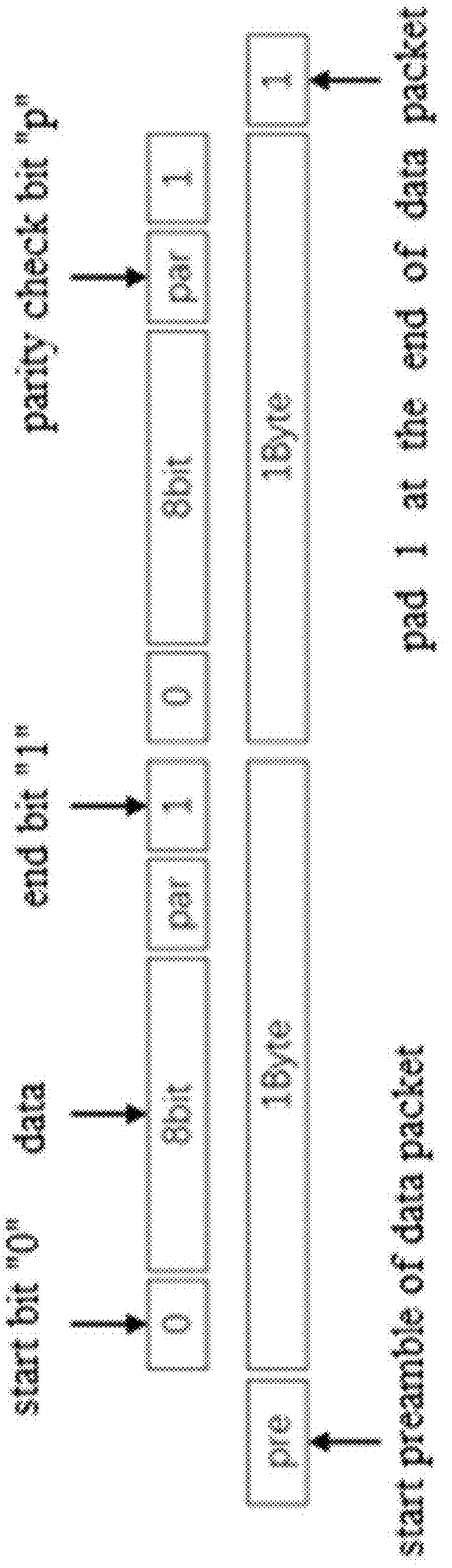
FIG. 7 shows a schematic diagram of a data structure of the Qi protocol in the embodiment of the present application.

Firstly, by referencing and explaining relevant content of the Qi protocol specification, it can be known that in the data structure of ASK protocol shown in FIG. 7, each received "Byte" requires 11 bits, including the "start bit '0'", "8 bits", "parity check bit", and "end bit '1'". Each data packet usually includes a start preamble, N bytes, and a padding 1 at the end. According to the law of the Qi protocol, further analysis shows that when the data bit is "1", the edge changes twice within a cycle, and the direction of the edge remains unchanged at the end of the cycle; and when the data bit is "0", the edge changes once within a cycle, and the direction of the edge changes at the end of the cycle. When the second data bit is "0", the direction of the edge changes back.

Figure 8:
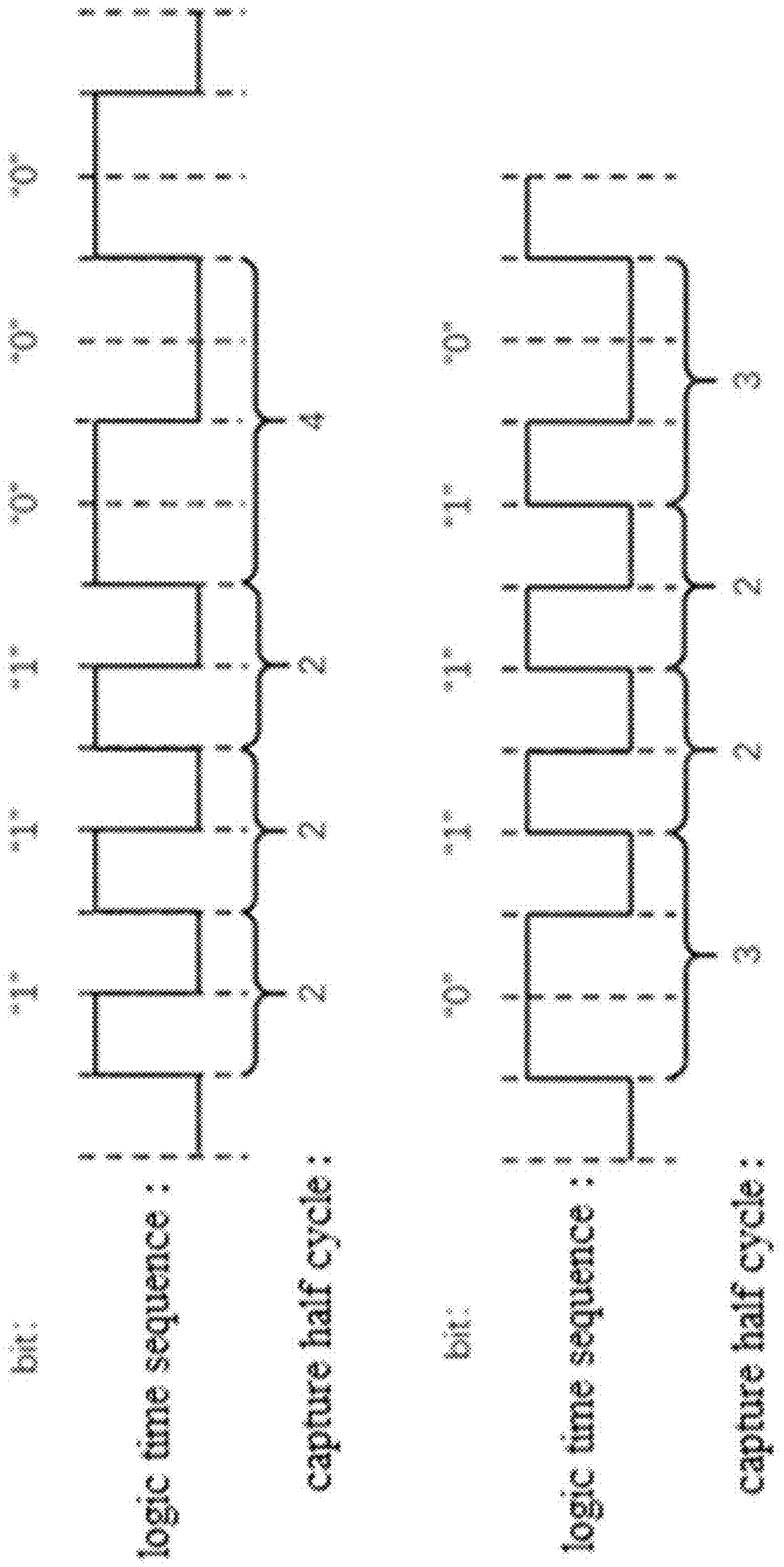
FIG. 8 shows a schematic diagram of the correspondence between bit data and the number of half cycles.

This embodiment uses single-edge counting judgment on a half cycle basis, which is more efficient and resource saving compared to dual-edge counting judgment. As shown in FIG. 8, the captured half cycle value may include the following situations:

"two half cycles" are captured: i.e., receiving one "1";

"three half cycles" are captured: indicating one "0" and one "1" at the time of first capturing, and indicating one "0" at the time of next capturing;

"four half cycles" are captured: i.e., receiving two "0"; and

"more than four half cycles" are captured: indicating timeout, data packet sending error, or end.

Correspondingly, the preset calculation rules mentioned above include: if the number of half cycles is two, then determining the corresponding bit number as 1; if the number of half cycles is three, then determining the corresponding bit number at the time of first capturing as one 0 and one 1, and determining the corresponding bit number at the time of next capturing as 0; if the number of half cycles is four, then determining the corresponding bit number as two 0; and if the number of half cycles is larger than four, then determining timeout, data packet sending error, or end.

In some other implementations of this embodiment, the data decoding module further includes a bit receiving state machine, and the calculation unit sends the calculated bit data to the bit receiving state machine; the bit receiving state machine performs format verification on the received bit data, stores successfully verified bit data in a data buffer register, and sets a validity flag and a second interrupt flag after completion of verification; and in case of verification error, the bit receiving state machine clears the validity flag, sets the second interrupt flag, and resets.

Further, the data decoding module also includes a half cycle value register, a count value reception register, a validity flag register, and a second interrupt flag register, in which the half cycle value, the count value reception, the validity flag and the second interrupt flag are stored respectively.

Figure 9:
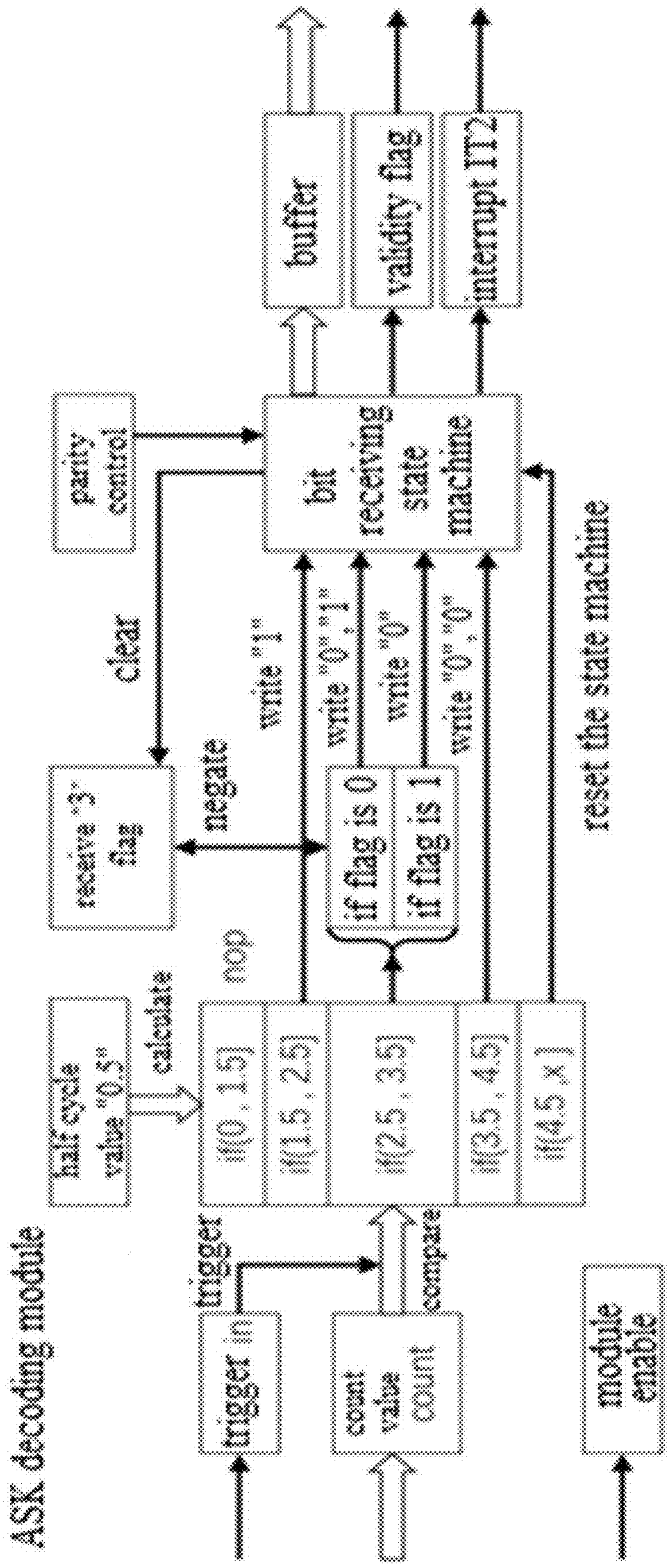
FIG. 9 shows a schematic diagram of an execution logic of the data decoding module provided in the embodiment of the present application.

Based on the above structure of the data decoding module and in combination with FIG. 9, the working process of the data decoding module will be described in detail as follows.

The "first interrupt flag" of the data sampling module (see the above) can trigger the data decoding module (if the module is used independently, it is directly written by the software) to decode the data. Each time it is triggered, the module runs once. Subsequently, based on the "half cycle value" configured by the software (the configuration requires that the cycle value be an even number) and based on the preset calculation rules mentioned above, the number of captured half cycles corresponding to the input total number of sampling times (Count) can be calculated, and the corresponding bit data "0" or bit data "1" can be written into the bit receiving state machine (specifically as shown in FIG. 8). The bit receiving state machine can verify each bit data written, and sequentially verify the start bit, 8 bit values, parity check value and end bit of the data packet. Then, the bit receiving state machine writes the successfully verified bit data into the data buffer register (Buff), and sets the validity flag register and the second interrupt flag register (writes 1 in the registers).

Figure 10:
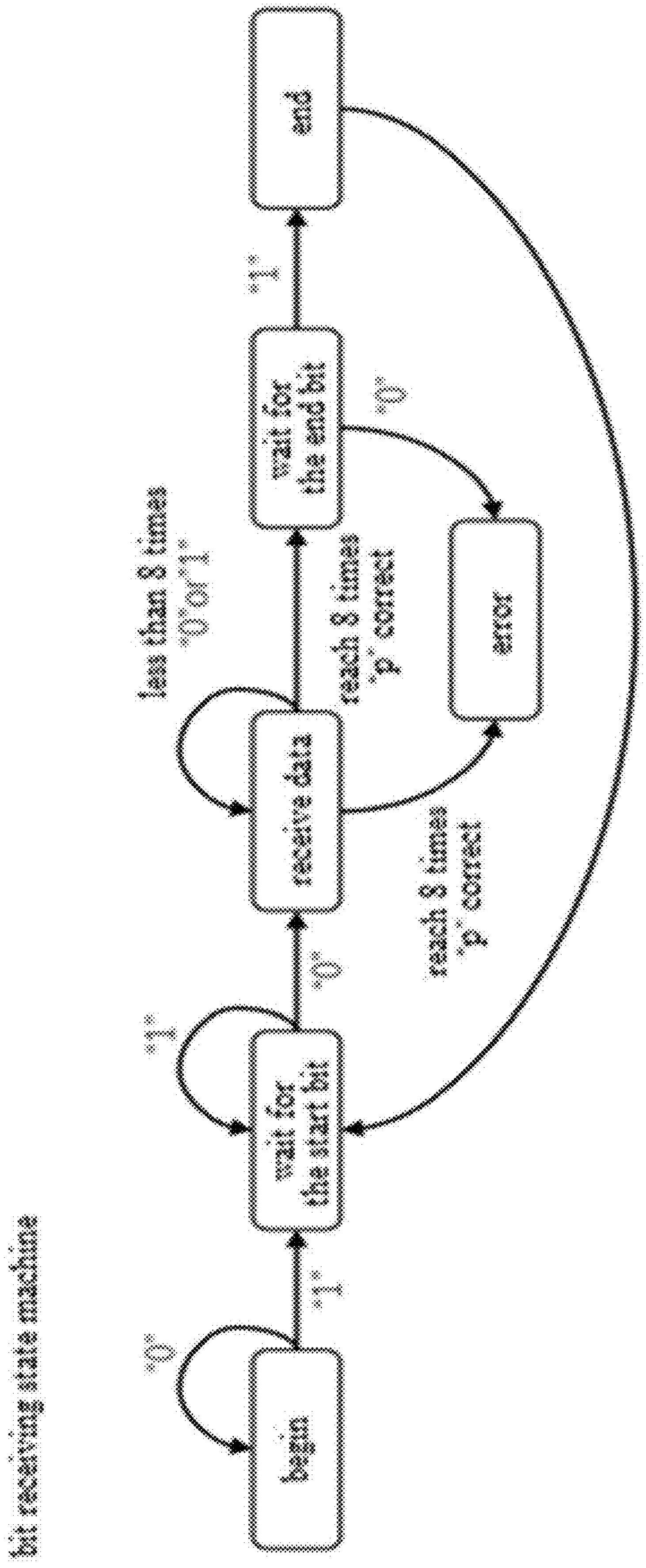
FIG. 10 shows a schematic diagram of a working process of the bit state machine.

The working process of the bit receiving state machine is shown in FIG. 10, where "p" represents the parity check value of the received 8 bits data, an initial value of which is configured by the MCU. The box in the figure represents the state, and the arrow represents the condition. Jump occurs once each time a bit "0" or "1" is written.

In addition, the value range and bit width of the above registers can be those shown in Table 1 below (the values in the table are only exemplary, and the value range and bit width of each register are not specifically limited in this embodiment).

TABLE 1

| Module | Register | Value range | Bit width/bit |
|---|---|---|---|
| Data sampling module | Module enable | 0-1 | 1 |
| | Reference value Vref | 0-1023 | 10 |
| | Hysteresis value delt | 0-31 | 5 |
| | Logic value logic | 0-1 | 1 |
| | Interrupt IT1 | 0-1 | 1 |
| | Output Count | 0-255 | 8 |
| Data decoding module | Module enable | 0-1 | 1 |
| | Trigger in | 0-1 | 1 |
| | Count value count | 0-255 | 8 |
| | Half cycle value | 0-63 | 6 |
| | Parity control | 0-1 | 1 |
| | Buffer register Buff | 0-255 | 8 |
| | Validity flag | 0-1 | 1 |
| | Interrupt IT2 | 0-1 | 1 |

It should be noted that the structures of the data sampling module and data decoding module described above, as well as the settings of various registers, are only preferred implementations of this embodiment. This embodiment is not limited to them, and any structures that can achieve their respective functions are within the scope of protection of the present application.

Figure 11:
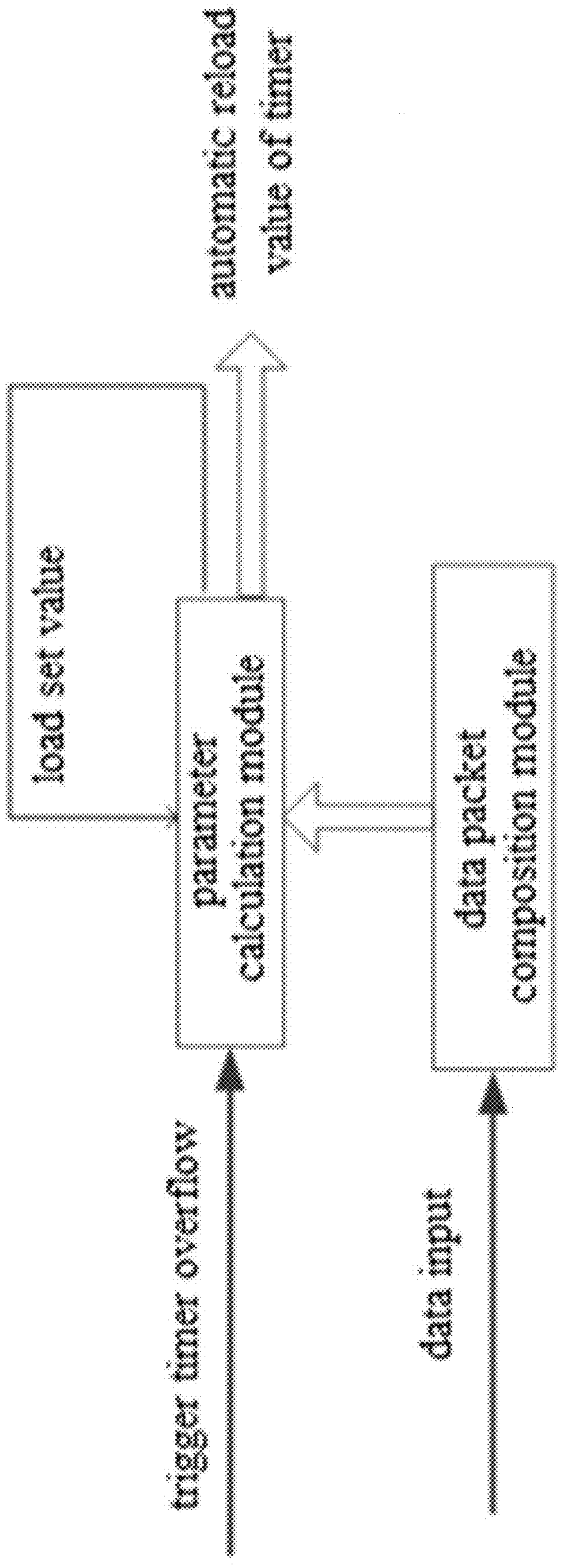
FIG. 11 shows a schematic diagram of a framework structure of the second signal processing module provided in the embodiment of the present application.

Reference is made to FIG. 11, which is a schematic diagram of the structure of the second signal processing module provided in the embodiment of the present application. As shown in FIG. 11, the second signal processing module is applied to a PWM output timer of a microcontroller, and may include a data packet composition module and a parameter calculation module. The data packet composition module converts the bit data to be sent into modulation data packets that comply with the Qi protocol, and sends the modulation data packets to the parameter calculation module. The parameter calculation module calculates the reload value of the PWM output timer and corresponding frequency modulation parameters respectively based on the modulation data packets and preset modulation configuration parameters, so that the PWM output timer outputs the corresponding pulse width modulation signal.

Figure 12:
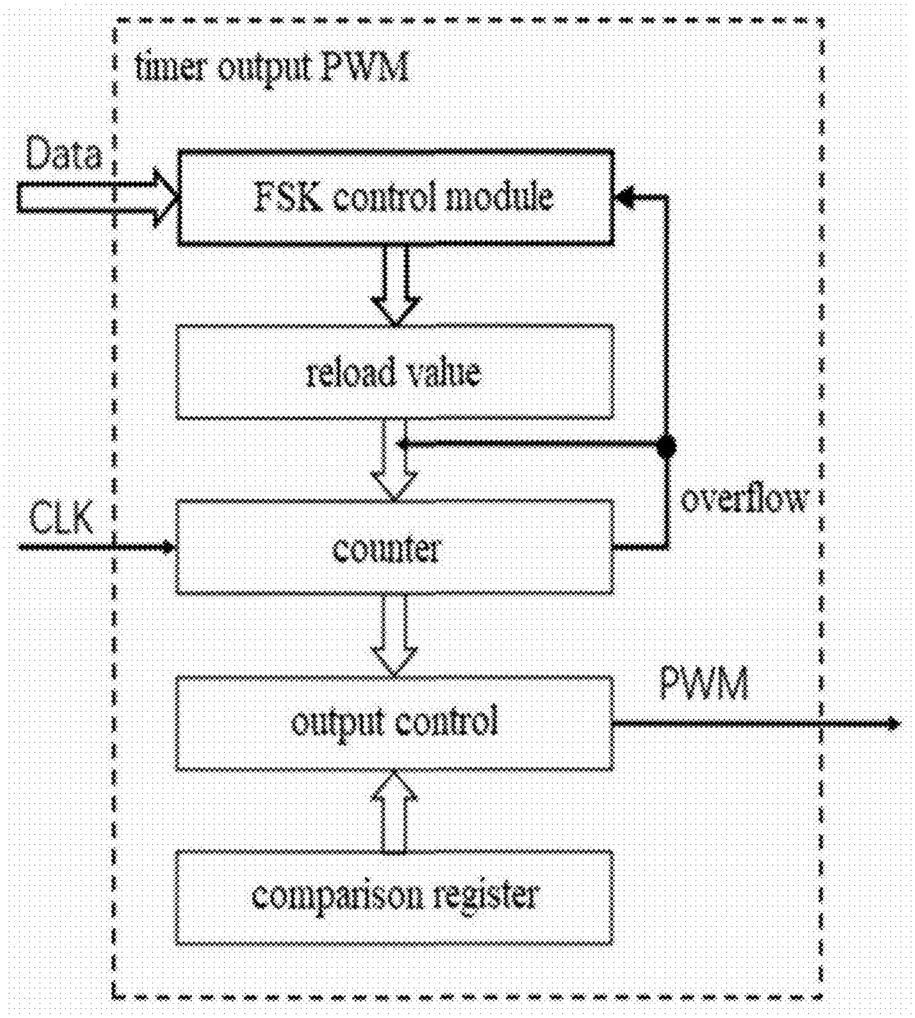
FIG. 12 shows a schematic diagram of the application of the second signal processing module provided in the embodiment of the present application in a PWM output timer.

The second signal processing module, as an independent hardware peripheral of the PWM output timer, can be set at the position shown in FIG. 12 on the PWM output timer. Functionally, it is equivalent to a data communication interface module, similar to the sending part of the I2C peripheral. The MCU can write into the registers of the second signal processing module through the bus, configure transmission parameters, write into a data buffer, and respond to interruption requests, etc. The second signal processing module can directly operate the registers of the timer.

The data packet composition module is mainly responsible for protocol layer control of FSK communication, converting the data packets that the software needs to send into control parameters that comply with the Qi protocol, and transmitting the output results to the parameter calculation module. The parameter calculation module is mainly responsible for physical layer control of FSK communication.

The second signal processing module provided in this embodiment includes the data packet composition module and the parameter calculation module. The data packet composition module can convert the bit data to be sent into modulation data packets that comply with the Qi protocol, and send the modulation data packets to the parameter calculation module. The parameter calculation module can calculate the reload value of the PWM output timer and corresponding frequency modulation parameters respectively based on the modulation data packets and preset modulation configuration parameters, so that the PWM output timer outputs the corresponding pulse width modulation signal. In this way, modulation signal processing in accordance with the vast majority of protocols on the market can be adapted to by configuring module parameters. Compared to the software implementation solution, the sending and receiving time sequence of the hardware peripheral is not affected by software interruption time, and the control will be more accurate. Meanwhile, the design of hardware circuit of this device is usually relatively simple, making it easy to design and implement; in case of software application, only some simple operations are required to complete data transmission, saving MCU computing resources. Moreover, this device can achieve advantages of both software and hardware, and can send data more efficiently, accurately and conveniently while ensuring its flexibility.

In some implementations of this embodiment, the packet composition module may include a data buffer register, an interrupt register, and a control register. The data buffer register stores the data to be sent written by the microcontroller; the interrupt register stores interrupt data written by the microcontroller, which is used to mark the completion of a single byte in the modulation data packet; and the control register stores control data written by the microcontroller, which is used to control turning on or off of the data packet composition module, sending of bit data, and the format of the modulation data packet.

In this embodiment, the data caching function is separated from other hardware of the MCU by setting the above registers. In this way, during the FSK data transmission process, the data buffer register is used to buffer the bit data to be sent. The MCU only needs to send data, which is a very simple operation, thus saving the time required for the MCU to form data packets, avoiding program blockage in running, effectively reducing the occupation of MCU resources, facilitating the MCU to perform other functions, and greatly improving its work efficiency.

The control register includes a start enable register and a send enable register (Send); the start enable register is configured to store a start enable status value written by the microcontroller, which is used to control the turning on or off of the data packet composition module; and the send enable register is configured to store a send enable status value written by the microcontroller, which is used to control sending of bit data.

The status value is usually a logic value of 1 or 0, where 1 is a high level, indicating the control of on state, that is, the data packet composition module is turned on or able to send data; and 0 is a low level, indicating the control of off state, that is, the data packet composition module is turned off or unable to send data.

When the data packet composition module is forming the data packets, the MCU first changes the enable status of the start enable register through the bus, turns on the data packet composition module, and then writes one byte of data to be sent into the data buffer register (Buff); then the MUC sets the send enable register (Send) to make the value of the register equal to 1, and the send enable register (Send) receives the bit data sent by the first signal processing module. Then the MCU continues to write into the control register through the bus, and the specific format of the data packets can be controlled according to a preset data packet format. The data packets of the preset format to be generated can be sent bit by bit to the parameter calculation module, and then the MCU continues to send interrupt data to the interrupt register (IT) through the bus. The interrupt flag is set to complete the interruption IT, the interruption is triggered, and the hardware controls clearing of the enable status value (clearing can be understood as making the value of the register equal to 0, with the control status being off). If the sending of data packets is not completed, the MCU continues to write "Buff" and sets the control register (setting can be understood as making the value of the register equal to 1, with the control status being on), which is not executed if the sending is completed.

Figure 13:
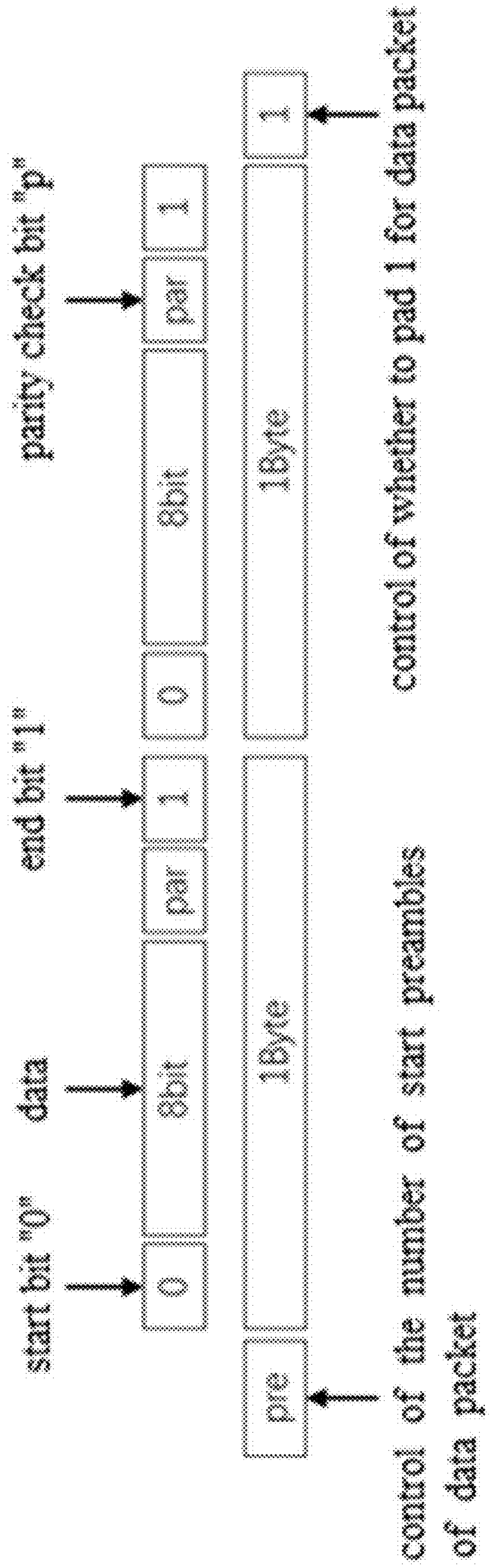
FIG. 13 shows a schematic diagram of a data structure of FSK data for the Qi protocol in the embodiment of the present application.

By referencing and explaining relevant content of the Qi protocol specification, it can be known from the definition of the Qi protocol specification that FSK data that complies with the Qi protocol usually has a certain format, and the specific data structure is shown in FIG. 13. Each "Byte" sent requires 11 bits, including the "start bit '0'", "8 bits", "parity check bit", and "end bit '1'". In front of each data packet, there may be a guidance (preamble pre) consisting of several bits "1", and after each data packet ends, one bit "1" may need to be added, that is, padding "1", so as to prevent the last bit from being lost.

Based on the data packet format of the above Qi protocol specification, the modulation data may contain a guide preamble and at least one byte of bit data. The control register further includes a preamble count register. When the status value of the send enable register is on a rising edge and the data to be sent in the data buffer register is empty, the preamble count register stores preamble control data written by the microcontroller, which is used to control a bit number of the guide preamble to achieve flexible configuration of the bit number of the guide preamble, further improving the flexibility and universality of the second signal processing module.

The bit data of each byte mentioned above includes a start bit, a data body bit, a parity check bit, and an end bit; the control register further includes a parity control register; when the status value of the send enable register is at a high level and the data to be sent is empty, the parity control register stores an initial parity check value written by the microcontroller, which is used to control an initial value of the parity check bit, thereby realizing the configuration of the data packet format, and further improving the flexibility and universality of the second signal processing module.

The modulation data packet further includes padding data located at the end of the data packet, and the control register further includes a padding control register; when the status value of the send enable register is at a low level, the padding control register stores padding flag data written by the microcontroller, which is used to indicate whether to perform end padding. In this way, when the status value of the send enable register is at the low level, the padding flag data is written, which will not affect the transmission of bit data and further ensure the accuracy of the second signal processing module in sending FSK data.

The padding flag data can also be a logic value of 1 or 0, where 1 is a high level, indicating that padding is needed; and 0 is a low level, indicating that padding is not needed.

Due to the differences in the guide preamble count, initial parity check value, whether to pad a bit "1" at the end and the like among different protocols, in order to be compatible with all Qi standard protocols and private communication protocols, the above preamble count register, parity control register and padding control register are set in this embodiment respectively, so that the guide preamble count, initial parity check value, and whether to pad a bit "1" at the end mentioned above can all be configured, which can further improve the universality of the second signal processing module.

Figure 14:
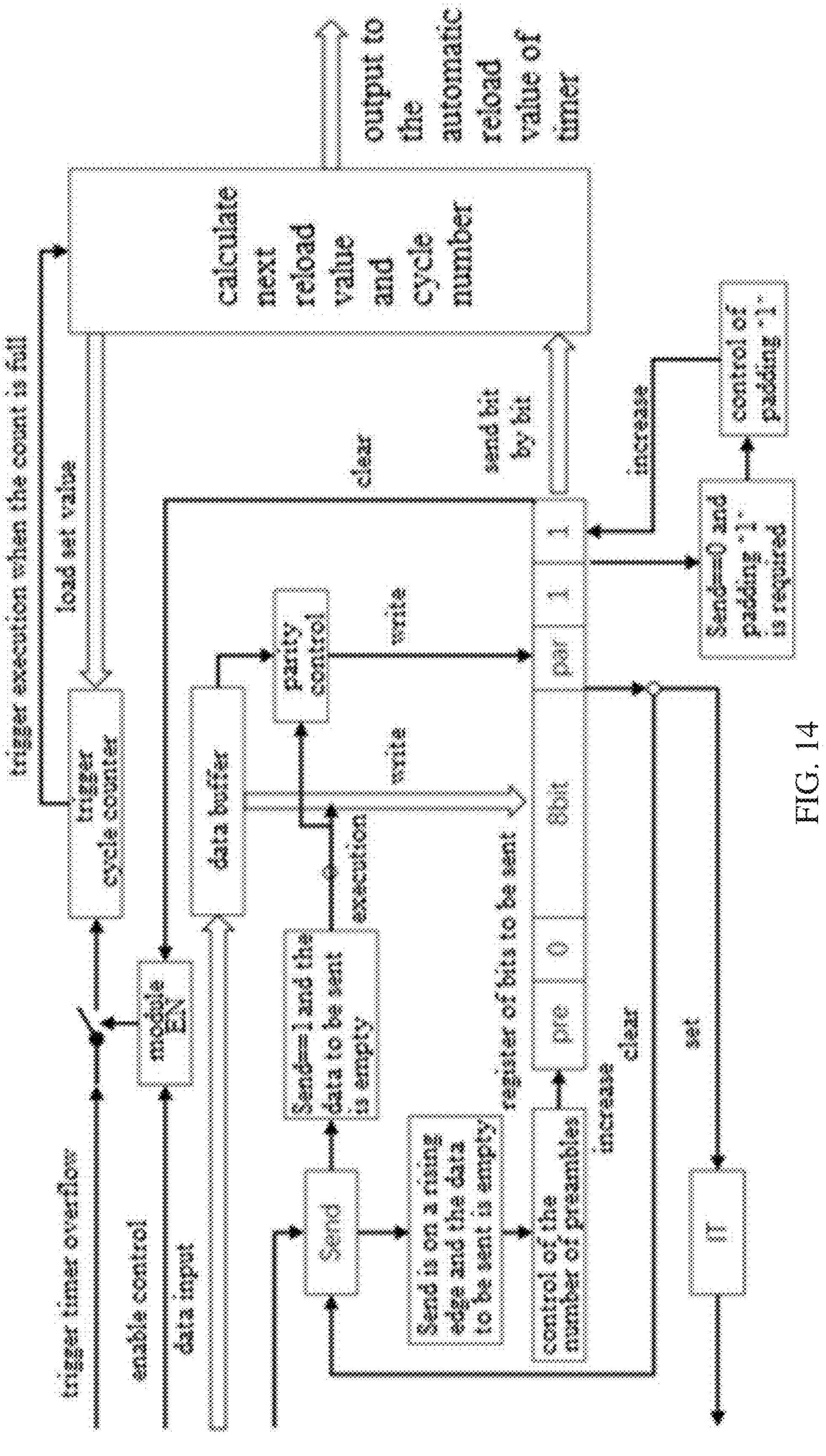
FIG. 14 shows a schematic diagram of an execution logic of the second signal processing module provided in the embodiment of the present application.
Figure 15:
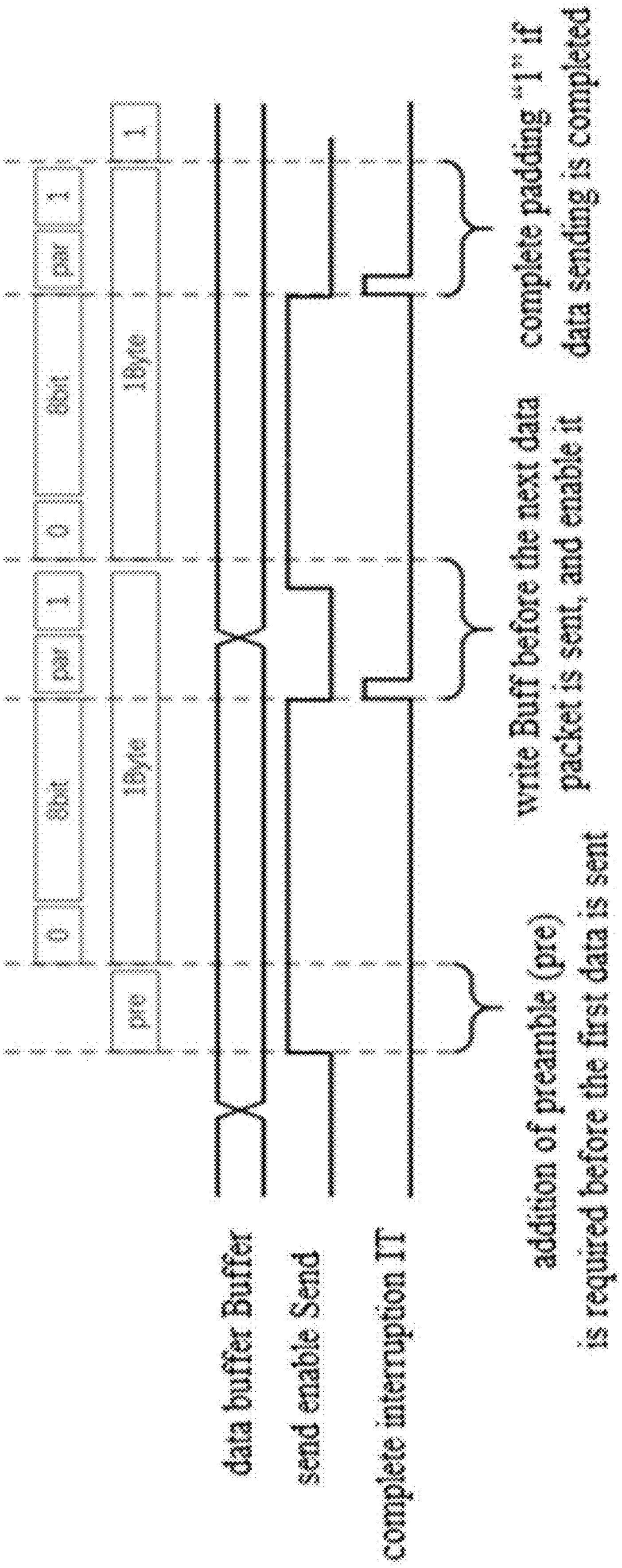
FIG. 15 shows a schematic diagram of the correspondence between the execution logic and data structure of the second signal processing module provided in the embodiment of the present application.

In terms of control time sequence, a main execution logic of the data packet composition module is shown in FIGS. 14 and 15 (the module functions are completed through the cooperation of software and hardware, and the "hardware" described below is a logic execution body of the second signal processing module of the present application).

Firstly, the MCU writes one byte to be sent into the data buffer register (Buff) through the bus, and then sets the send enable register, making the value of the register equal to 1. Since the data is not being sent at this time (the beginning of the data packet), several bits "1" can be added according to the configuration value to calculate the parity check value and generate a "11 bit" data packet, which is sent bit by bit. After 8 bits are sent, the hardware controls clearing of "Send" (clearing means making the value of the register equal to 0) and sets the interrupt flag "Complete Interrupt IT" to trigger interruption. The software processes the interrupt function (the software clears the "IT" flag); if sending of the data packet is not completed, then the MCU continues to write "Buff" and sets "Send", which will not be executed if sending of the data packet is completed. The hardware continues to send the parity check bit and the end bit. After sending of the end bit is completed, if "Send" is 1, then the process jumps to the second step; and if "Send" is 0, then the process jumps to the step of padding "1" below; the step of padding "1" is to pad when it is required to pad bit "1" at the end according to the configuration; "1" is padded and sent; after completion, the padding "1" flag bit of this module is cleared, and the send enable status of this module is cleared.

Figure 16:
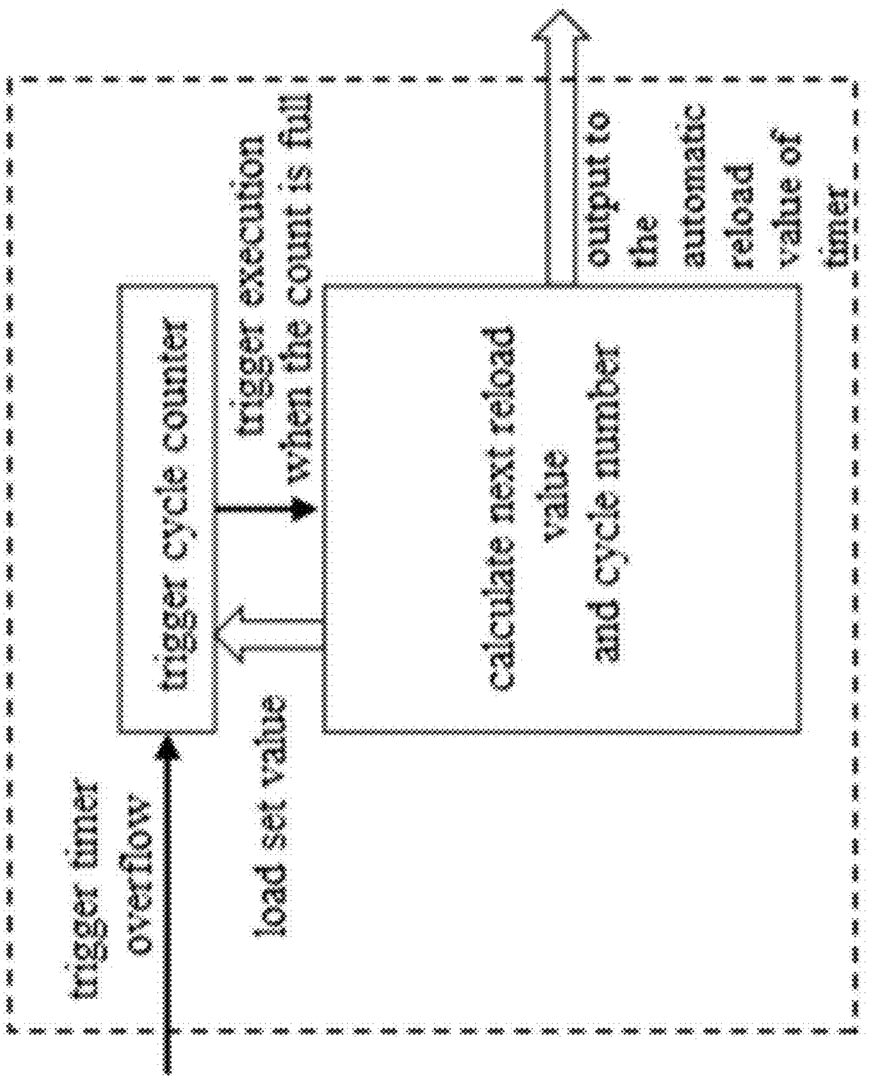
FIG. 16 shows a schematic diagram of the structure of the parameter calculation module provided in the embodiment of the present application.

In some other implementations of this embodiment, as shown in FIGS. 16, the parameter calculation module includes a trigger cycle counter and a calculation submodule; the frequency modulation parameters include a load et value of the trigger cycle counter, and the trigger cycle counter counts based on the load set value; if the count overflows, the calculation submodule is triggered to calculate; and after being triggered, the calculation submodule calculates the reload value of the PWM output timer and corresponding load set value respectively based on the modulation data packet and preset modulation configuration parameters, sends the load set value to the trigger cycle counter, and sends the reload value to the PWM output timer.

Figure 17:
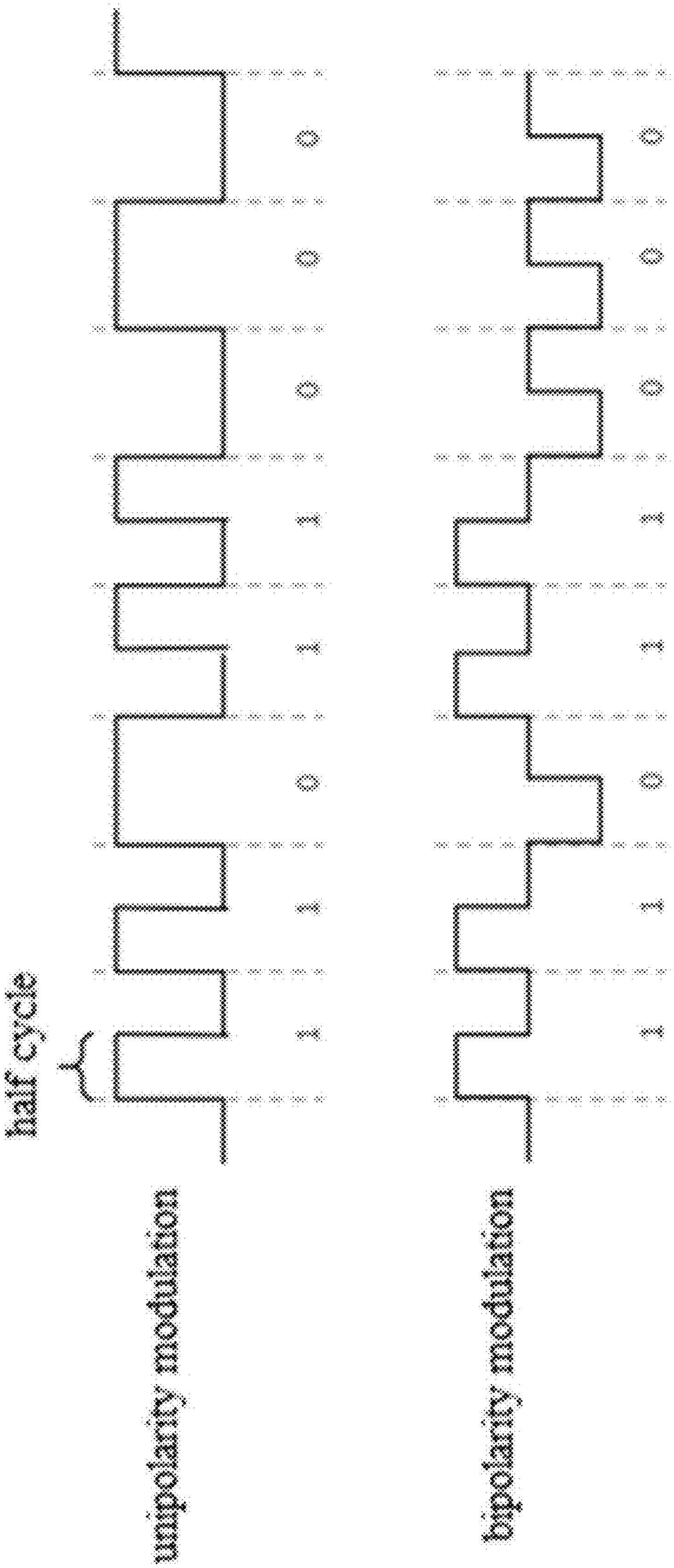
FIG. 17 shows a schematic diagram of the output of bit "0" and bit "1" in the embodiment of the present application.

This embodiment references and explains relevant content of the Qi protocol specification: FSK has the difference between "unipolarity" and "bipolarity", as well as the difference between "positive modulation" and "negative modulation". The way to represent bit "0" and bit "1" is shown in FIG. 17, that is, "0" changes the frequency once in one cycle, and "1" changes the frequency twice in one cycle. Therefore, the module designed in the present application needs to be able to switch polarity, configure modulation level, and correctly output bits "0" and "1".

Further, for example, if the "modulation cycle" of a certain FSK signal is 500 us (the corresponding frequency is 2 KHz), since in most cases, the frequency needs to be adjusted twice in one "modulation cycle", frequency switching control should be performed on a "half modulation cycle" basis, which is 250 us (i.e., a first parameter, the corresponding frequency being 4 KHz).

In the process of modulation signal processing, for example, the PWM frequency is 100 KHz, that is, the cycle is 10 us (a second parameter), namely, the "timer overflow frequency" is 100 KHz (the cycle is 10 us), the "trigger cycle counter" triggers self-subtraction on this basis, and when it is equal to 0, the calculation module of the next part is triggered. If an initial value is set, namely, the number of modulation cycles is 25 (i.e., a third parameter), then the next "modulation half cycle" can be set to 250 us.

The parameter calculation module provided in this embodiment triggers the "timer overflow trigger" once every other PWM cycle (the second parameter), and is subjected to frequency division by the "trigger cycle counter" (self-subtracting from the third parameter to 0), so that the module can perform the following two tasks every fixed "half modulation cycle" (the first parameter): 1) based on the bit data to be sent, setting the "automatic reload value" of the PWM output timer (which is directly related to the second parameter) to switch the output frequency of the PWM output timer; and 2) resetting the value of the "trigger cycle counter" inside the module to set the third parameter based on the second parameter, so that when FSK data is output, the output frequency of the PWM output timer can be switched with a fixed modulation cycle (the first parameter).

It should be noted that the values of the above three parameters are all determined by the actual communication protocol, and the present application is compatible with all communication protocols. The third parameter is equal to the first parameter divided by the second parameter. Since FSK communication essentially modulates the carrier frequency, the cycle (the second parameter) will change with the change of frequency, and the value of the first parameter is relatively fixed, so the third parameter needs to change with the change of the first parameter value.

In some other implementations of this embodiment, the calculation submodule includes a configuration register and a calculation unit, and the configuration register includes a cycle number register, a cycle difference register, a fundamental frequency register, a modulation level register, and a polarity selection register; and the modulation configuration parameters include a modulation cycle number, a modulation cycle difference, a set fundamental frequency, a modulation level, a modulation polarity and the like stored in the cycle number register, the cycle difference register, the fundamental frequency register, the modulation level register and the polarity selection register respectively.

In this embodiment, the modulation configuration parameters that the parameter calculation module needs to configure include carrier reference frequency (related to the second parameter), modulation cycle length (related to the first parameter), polarity selection (related to the second parameter), etc., which can be pre-calculated by the MCU and configured into the corresponding registers, so that the parameter calculation module can calculate the frequency modulation parameters mentioned above.

The principle of calculating the above frequency modulation parameters by the parameter calculation module includes:

the polarity selection includes "+", "−", "+−", and "−+";

the automatic reload value=set fundamental frequency+1±modulation level;

the cycle counter (positive)=the number of modulation cycles-positive modulation cycle difference; and the cycle counter (negative)=the number of modulation cycles+negative modulation cycle difference.

This embodiment enables the second signal processing module to be compatible with the usage requirements of all QI protocols by configuring the values of the aforementioned registers. For example, when the frequency of PWM output timer of a certain MCU is 48 MHZ, the relationships between the configured values of various registers and the actually output FSK parameters can be as shown in Table 2 and Table 3 below, respectively.

TABLE 2

| | Bit width | Configured value | | Automatic reload value | Generated PWM frequency/KHz | Cycle counter value | Modulation half cycle/us |
|---|---|---|---|---|---|---|---|
| Number of modulation cycles | 10 bit | 64 | Positive modulation | | | | |
| Positive modulation cycle difference | 4 bit | 0 | Fundamental frequency | 375 | 128.00 | 64 | 500.00 |
| Negative modulation cycle difference | 4 bit | 1 | Negative modulation | 383 | 125.33 | 63 | 502.69 |
| Set fundamental frequency | 8 bit | 374 | | | | | |
| Modulation level | 4 bit | 8 | | | | | |
| Polarity selection | 2 bit | — | | | | | |

TABLE 3

| | Bit width | Configured value | | Automatic reload value | Generated PWM frequency/KHz | Cycle counter value | Modulation half cycle/us |
|---|---|---|---|---|---|---|---|
| Number of modulation cycles | 10 bit | 256 | Positive modulation | | | | |
| Positive modulation cycle difference | 4 bit | 0 | Fundamental frequency | 375 | 128.00 | 256 | 2000.00 |
| Negative modulation cycle difference | 4 bit | 5 | Negative modulation | 383 | 125.33 | 251 | 2002.77 |
| Set fundamental frequency | 8 bit | 374 | | | | | |
| Modulation level | 4 bit | 8 | | | | | |
| Polarity selection | 2 bit | — | | | | | |

Specifically, the calculation submodule may further include an intermediate variable register; the calculation unit calculates a logic value corresponding to the bit data to be sent based on the modulation polarity, writes the logic value into the intermediate variable register, and records a high or low logic of output frequency; and the calculation unit calculates the reload value and the load set value corresponding to the logic value under the corresponding modulation polarity based on the preset modulation configuration parameters.

Specifically, the MCU can first preset the values of some registers, as shown in Table 4 below.

TABLE 4

| Register | Code in the present application |
|---|---|
| Number of modulation cycles | Reg0 |
| Positive modulation cycle difference | Reg1 |
| Negative modulation cycle difference | Reg2 |
| Set fundamental frequency | Reg3 |
| Modulation level | Reg4 |
| Polarity selection | Reg5 |

The "polarity selection" can be set to "+", "−" and "+". The inputs of this module include: the trigger signal of the previous level, and the "bit data to be sent"; and the outputs of this module include: the value "TR1" output to the "trigger cycle counter", and the reload value "TR2" output to the PWM timer.

An intermediate variable register "Logic" is set, and a high or low logic of output frequency is recorded. The "Logic" consists of two bits, with the values and meanings shown in Table 5 below.

TABLE 5

| Register value (binary system) | Register value (decimal system) | Logic represented | Corresponding frequency |
|---|---|---|---|
| 2'b00 | 0 | −1 | Frequency of negative modulation |
| 2'b01 | 1 | 0 | Non-modulated Frequency |
| 2'b11 | 3 | +1 | Frequency of positive modulation |

Considering that one protocol cycle includes two "half cycles", the number of times of the trigger signal of the previous level is recorded, which is divided into a first-time trigger and a second-time trigger. According to "polarity selection", "number of triggers" and "bit data to be sent", the values of variable "Logic" are operated as shown in Tables 6a to 6c below.

TABLE 6a

| | | bit to be sent "0" | bit to be sent "1" |
|---|---|---|---|
| "±" | first-time trigger | logic = 2'b00 | logic = 2'b11 |
| | second-time trigger | logic = 2'b01 | logic = 2'b01 |

TABLE 6b

| | | bit to be sent "0" | bit to be sent "1" |
|---|---|---|---|
| "+" | first-time trigger | logic^ = 2'b10 | logic^ = 2'b10 |
| | second-time trigger | logic unchanged | logic^ = 2'b10 |

TABLE 6c

| | | bit to be sent "0" | bit to be sent "1" |
|---|---|---|---|
| "−" | first-time trigger | logic^ = 2'b01 | logic^ = 2'b01 |
| | second-time trigger | logic unchanged | logic^ = 2'b01 |

In the above tables, "^=" represents writing the value obtained after performing XOR operation on the values on the two sides into the left register.

According to the "Logic" values in the previous step, the corresponding calculation operations are performed as shown in Table 7, and the calculation results "TR1" and "TR2" are output. The meaning of the final output results of the second signal processing module is: the timer frequency divided by TR2 is equal to the PWM output frequency; and TR1 divided by the PWM output frequency is equal to half cycle duration.

TABLE 7

| Judge Logic value | Corresponding frequency | Calculation operation |
|---|---|---|
| 2'b00 | Negative modulation | TR1 = Reg0 − Reg2<br>TR2 = Reg3 + 1 + Reg4 |
| 2'b01 | Fundamental frequency | TR1 = Reg0<br>TR2 = Reg3 + 1 |
| 2'b11 | Positive modulation | TR1 = Reg0 + Reg1<br>TR2 = Reg3 + 1 − Reg4 |

More specifically, the value ranges and bit widths of the above registers can be as shown in Table 8 below.

TABLE 8

| | Value range | Bid width/bit |
|---|---|---|
| Number of modulation cycles | 0-1023 | 10 |
| Positive modulation cycle difference | 0-15 | 4 |
| Negative modulation cycle difference | 0-15 | 4 |
| Set fundamental frequency | 0-1023 | 10 |
| Modulation level | 0-15 | 4 |
| Polarity selection | 0-3 | 2 |
| Number of preambles | 0-7 | 3 |
| Initial parity check value | 0-1 | 1 |
| Control of padding 1 at the end | 0-1 | 1 |
| Send | 0-1 | 1 |
| Buff | 0-255 | 8 |
| Module enable EN | 0-1 | 1 |
| Interrupt IT | 0-1 | 1 |

It should be noted that the structures of the data packet composition module and parameter calculation module described above, as well as the settings of various registers, are only preferred implementations of this embodiment. This embodiment is not limited to them, and any structures that can achieve their respective functions are within the scope of protection of the present application.

It can be understood that the various implementations of the first signal processing module described above can each be applied to a modulation signal processing device including the first signal processing module but not including the second processing module, or to a modulation signal processing devices including both the first signal processing module and the second processing module. Similarly, the various implementations of the second signal processing module described above can also each be applied to a modulation signal processing device including the second signal processing module but not including the first processing module, or to a modulation signal processing device including both the first signal processing module and the second processing module. For the specific implementations, reference can be made to the above records, which will not be listed one by one herein.

Figure 18:
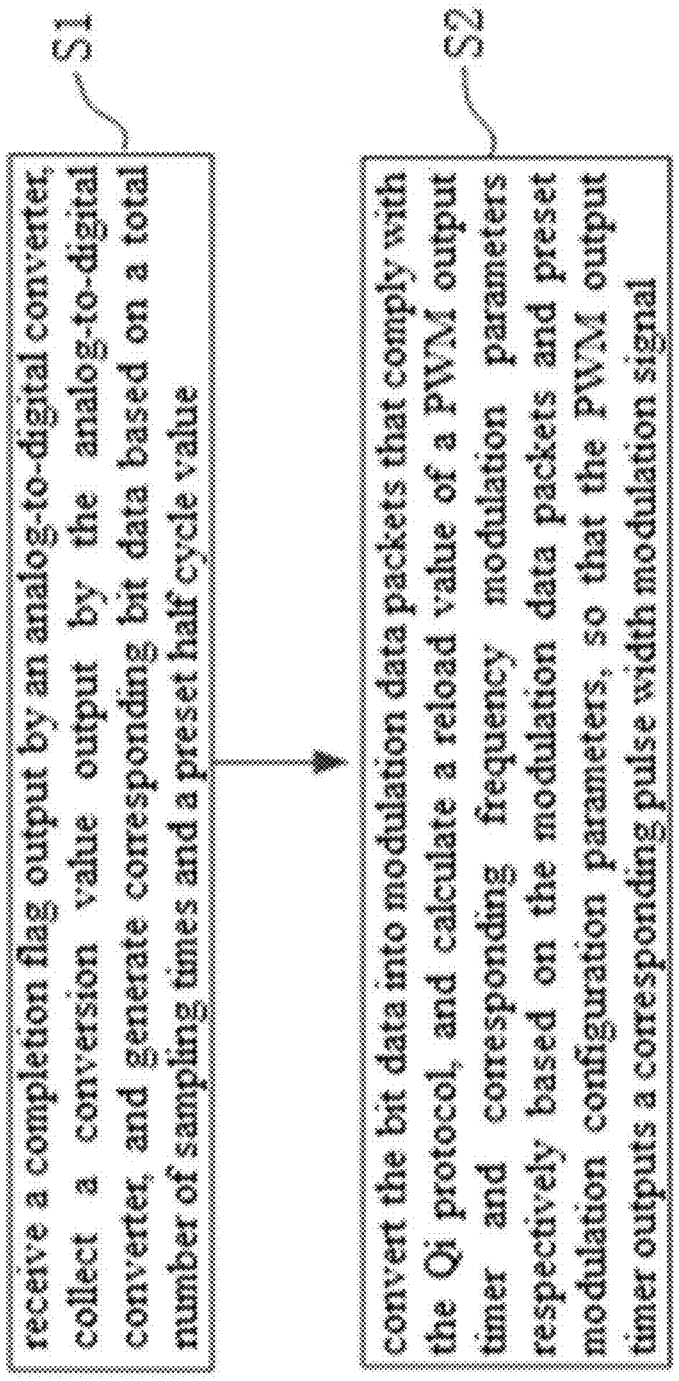
FIG. 18 shows a schematic flowchart of the modulation signal processing method provided in the embodiment of the present application.

Based on the same concept as the modulation signal processing device described above, this embodiment also provides a modulation signal processing method; as shown in FIG. 18, the method includes at least one step of steps S1 and S2 below:

Step S1: receiving a completion flag output by an analog-to-digital converter, collecting a conversion value output by the analog-to-digital converter, and generating corresponding bit data based on a total number of sampling times and a preset half cycle value; and Step S2: converting the bit data into modulation data packets that comply with the Qi protocol, and calculating a reload value of a PWM output timer and corresponding frequency modulation parameters respectively based on the modulation data packets and preset modulation configuration parameters, so that the PWM output timer outputs a corresponding pulse width modulation signal.

The modulation signal processing method provided in this embodiment is based on the same concept as the modulation signal processing device described above, and therefore can at least achieve the advantageous effects that the above modulation signal processing device can achieve, which will not be described repeatedly herein.

Based on the same concept as the modulation signal processing device described above, this embodiment also provides a microcontroller, on which the modulation signal processing device as described in any of the above implementations is integrated.

The microcontroller provided in this embodiment is based on the same concept as the modulation signal processing device described above, and therefore can at least achieve the advantageous effects that the above modulation signal processing device can achieve, which will not be described repeatedly herein.

Based on the same concept as the modulation signal processing device described above, this embodiment also provides an electronic device, which includes a memory, a processor, a computer program stored on the memory and capable of running on the processor, and a digital logic circuit including the modulation signal processing device described above. The electronic device can be a chip formed with the microcontroller, as well as the wireless charging system, motor control system (or only a control device of the system) and the like that use the chip.

The electronic device provided in the embodiment of the present application and the modulation signal processing device provided in the embodiment of the present application share the same inventive concept, and have the same advantageous effects as the methods adopted, operated or implemented by the modulation signal processing device.

It should be noted that:

In the description provided herein, a large number of specific details are explained. However, it can be understood that the embodiments of the present application can be carried out without these specific details. In some examples, the well-known structures and techniques are not shown in detail to avoid obscuring the understanding of the description.

Similarly, it should be understood that in order to simply the present application and assist in understanding one or more of the various inventive aspects, in the above description of exemplary embodiments of the present application, various features of the present application are sometimes grouped together into a single embodiment, figure, or description thereof. However, the disclosed method should not be interpreted as reflecting the following intention: the claimed present application needs more features than those explicitly recorded in each claim. More precisely, as reflected in the following claims, the inventive aspects lie in having fewer features than all the features in the previously disclosed individual embodiments. Therefore, the claims following a specific implementation are explicitly incorporated into the specific implementation, where each claim itself serves as a separate embodiment of the present application.

In addition, it can be understood by those skilled in the art that although some embodiments herein include certain features included in other embodiments rather than other features, the combination of features of different embodiments means falling within the scope of the present application and forming different embodiments. For example, in the following claims, any one of the claimed embodiments can be used in any combination.

Described above are only preferred specific embodiments of the present application, but the scope of protection of the present application is not limited to this. Any changes or replacements that can be easily conceived by those skilled in the art within the technical scope disclosed by the present application should be covered within the scope of protection of the present application. Therefore, the scope of protection of the present application should be accorded with the scope of protection of the claims.

The invention claimed is:

1. A modulation signal processing device, which is applied to a microcontroller, and which comprises a first signal processing module and a second signal processing module, wherein:

the first signal processing module is connected to an analog-to-digital converter of the microcontroller, and is configured to: receive a completion flag output by the analog-to-digital converter, collect a conversion value output by the analog-to-digital converter, and generate corresponding bit data based on a total number of sampling times and a preset half cycle value; and the second signal processing module is connected to a Pulse Width Modulation (PWM) output timer of the microcontroller, and is configured to: convert the bit data into modulation data packets that comply with the Qi protocol, and calculate a reload value of the PWM output timer and corresponding frequency modulation parameters respectively based on the modulation data packets and preset modulation configuration parameters, so that the PWM output timer outputs a corresponding pulse width modulation signal.

2. The device according to claim 1, wherein the first signal processing module comprises a data sampling module and a data decoding module;

the data sampling module receives the completion flag output by the analog-to-digital converter, collects the conversion value output by the analog-to-digital converter, and outputs the recorded total number of sampling times and a first interrupt flag; and the data decoding module receives the first interrupt flag and generates corresponding bit data based on the received total number of sampling times and the preset half cycle value.

3. The device according to claim 2, wherein the data sampling module comprises logic circuits and a counter, and the counter is configured to record the total number of sampling times; and the logic circuits are configured to generate a logic value based on the conversion value and preset comparison values, trigger the output of the total number of sampling times when the logic value performs edge jumping, clear the total number of sampling times to zero, and issue the first interrupt flag.

4. The device according to claim 3, wherein the preset comparison values comprise a reference value and a hysteresis value, and the logic circuits comprise a first logic circuit and a second logic circuit;

the first logic circuit inputs the reference value, the hysteresis value and the logic value, and outputs an actual comparison value based on preset logical conditions; the second logic circuit inputs the actual comparison value and the conversion value, and outputs the logic value; and the preset logical conditions comprise:

if the logic value is 1, then the actual comparison value is equal to a difference between the reference value and the hysteresis value; and if the logic value is 0, then the actual comparison value is equal to a sum of the reference value and the hysteresis value.

5. The device according to claim 4, wherein the data sampling module further comprises a reference value register, a hysteresis value register, a count value output register, a logic value register, and a first interrupt flag register, in which the reference value, the hysteresis value, the total number of sampling times, the logic value, and the first interrupt flag are stored respectively.

6. The device according to claim 2, wherein the data decoding module comprises a calculation unit, which determines the number of captured half cycles according to the total number of sampling times, and calculates corresponding bit data according to the number of half cycles based on preset calculation rules;

wherein the preset calculation rules comprise:

if the number of half cycles is two, then determining the corresponding bit number as 1;

if the number of half cycles is three, then determining the corresponding bit number at the time of first capturing as one 0 and one 1, and determining the corresponding bit number at the time of next capturing as 0;

if the number of half cycles is four, then determining the corresponding bit number as two 0; and if the number of half cycles is larger than four, then determining timeout, data packet sending error, or end.

7. The device according to claim 6, wherein the data decoding module further comprises a bit receiving state machine, and the calculation unit sends the calculated bit data to the bit receiving state machine; and the bit receiving state machine performs format verification on the received bit data, stores successfully verified bit data in a data buffer register, and sets a validity flag and a second interrupt flag after completion of verification; and in case of verification error, the bit receiving state machine clears the validity flag, sets the second interrupt flag, and resets.

8. The device according to claim 7, wherein the bit receiving state machine sequentially verifies each bit data written, and sequentially verifies the start bit, 8 bit values, parity check value, and end bit of the data packet.

9. The device according to claim 6, wherein the data decoding module further comprises a half cycle value register, a count value reception register, a validity flag register, and a second interrupt flag register, in which the half cycle value, the count value reception, the validity flag and the second interrupt flag are stored respectively.

10. The device according to claim 1, wherein the second signal processing module comprises a data packet composition module and a parameter calculation module;

the data packet composition module converts the bit data to be sent into modulation data packets that comply with the Qi protocol, and sends the modulation data packets to the parameter calculation module; and the parameter calculation module calculates the reload value of the PWM output timer and corresponding frequency modulation parameters respectively based on the modulation data packets and preset modulation configuration parameters, so that the PWM output timer outputs the corresponding pulse width modulation signal.

11. The device according to claim 10, wherein the data packet composition module comprises a data buffer register, an interrupt register and a control register;

the data buffer register stores the data to be sent written by the microcontroller;

the interrupt register stores interrupt data written by the microcontroller, which is used to mark the completion of a single byte in the modulation data packet; and the control register stores control data written by the microcontroller, which is used to control turning on and off of the data packet composition module, sending of bit data, and the format of the modulation data packet.

12. The device according to claim 11, wherein the control register comprises a start enable register and a send enable register; the start enable register stores a start enable status value written by the microcontroller, which is used to control the turning on and off of the data packet composition module; and the send enable register stores a send enable status value written by the microcontroller, which is used to control sending of bit data.

13. The device according to claim 12, wherein the modulation data packet comprises a guide preamble and at least one byte of bit data, and the control register further comprises a preamble count register; when the send enable status value is on a rising edge and the data to be sent in the data buffer register is empty, the preamble count register stores preamble control data written by the microcontroller, which is used to control a bit number of the guide preamble.

14. The device according to claim 13, wherein the bit data of each byte comprises a start bit, a data body bit, a parity check bit, and an end bit; and the control register further comprises a parity control register; when the send enable status value is at a high level and the data to be sent in the data buffer register is empty, the parity control register stores an initial parity check value written by the microcontroller, which is used to control an initial value of the parity check bit.

15. The device according to claim 13, wherein the modulation data packet further comprises padding data located at the end of the data packet, and the control register further comprises a padding control register; when the send enable status value is at a low level, the padding control register stores padding flag data written by the microcontroller, which is used to indicate whether to perform end padding.

16. The device according to claim 10, wherein the parameter calculation module comprises a trigger cycle counter and a calculation submodule; the frequency modulation parameters comprise a load set value of the trigger cycle counter, and the trigger cycle counter counts based on the load set value; if the count overflows, the calculation submodule is triggered to calculate; and after being triggered, the calculation submodule calculates the reload value of the PWM output timer and corresponding load set value respectively based on the modulation data packets and preset modulation configuration parameters, sends the load set value to the trigger cycle counter, and sends the reload value to the PWM output timer.

17. The device according to claim 16, wherein the calculation submodule comprises a configuration register and a calculation unit, and the configuration register comprises a cycle number register, a cycle difference register, a fundamental frequency register, a modulation level register, and a polarity selection register; and the modulation configuration parameters comprise a modulation cycle number, a modulation cycle difference, a set fundamental frequency, a modulation level and a modulation polarity stored in the cycle number register, the cycle difference register, the fundamental frequency register, the modulation level register and the polarity selection register respectively.

18. The device according to claim 17, wherein the calculation submodule further comprises an intermediate variable register; the calculation unit calculates a logic value corresponding to the bit data to be sent based on the modulation polarity, writes the logic value into the intermediate variable register, and records a high or low logic of output frequency; and the calculation unit calculates the reload value and the load set value corresponding to the logic value under the corresponding modulation polarity based on the preset modulation configuration parameters.

19. A microcontroller, on which the modulation signal processing device according to claim 1 is integrated.

20. A modulation signal processing method, comprising:

receiving a completion flag output by an analog-to-digital converter, collecting a conversion value output by the analog-to-digital converter, and generating corresponding bit data based on a total number of sampling times and a preset half cycle value; and converting the bit data into modulation data packets that comply with the Qi protocol, and calculating a reload value of a Pulse Width Modulation (PWM) output timer and corresponding frequency modulation parameters respectively based on the modulation data packets and preset modulation configuration parameters, so that the PWM output timer outputs a corresponding pulse width modulation signal.

* * * * *